United States Patent
Sugawara

(10) Patent No.: US 8,280,244 B2
(45) Date of Patent: Oct. 2, 2012

(54) OPTICAL RING NETWORK SYSTEM

(75) Inventor: Eiji Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 307 days.

(21) Appl. No.: 12/698,497

(22) Filed: Feb. 2, 2010

(65) Prior Publication Data

US 2010/0209106 A1 Aug. 19, 2010

(30) Foreign Application Priority Data

Feb. 18, 2009 (JP) ................................. 2009-035641

(51) Int. Cl.
*G02F 1/00* (2006.01)
*G01R 31/08* (2006.01)
(52) U.S. Cl. .......... 398/4; 398/1; 398/3; 398/5; 370/216
(58) Field of Classification Search .................. 398/4, 45
See application file for complete search history.

(56) References Cited

U.S. PATENT DOCUMENTS

| | | | | |
|---|---|---|---|---|
| 5,537,239 A * | 7/1996 | Sotom et al. ..................... 398/45 |
| 5,717,796 A * | 2/1998 | Clendening ..................... 385/24 |
| 6,137,603 A | 10/2000 | Henmi |
| 6,292,464 B1 * | 9/2001 | Elahmadi et al. ............. 370/223 |
| 6,771,907 B1 | 8/2004 | Yoshifuji et al. |
| 6,895,182 B1 * | 5/2005 | Moriyama et al. ................ 398/3 |
| 6,963,995 B2 * | 11/2005 | Fee ............... 714/4.12 |
| 7,009,578 B2 * | 3/2006 | Nolan et al. ................... 343/915 |
| 7,039,051 B2 * | 5/2006 | Ohashi et al. ................. 370/389 |
| 7,046,619 B2 * | 5/2006 | Alagar et al. ................. 370/216 |
| 7,123,831 B2 * | 10/2006 | Bischoff et al. ..................... 398/5 |
| 7,283,739 B2 * | 10/2007 | Kinoshita et al. ................ 398/3 |
| 7,570,603 B2 * | 8/2009 | Fan et al. ..................... 370/254 |
| 7,916,723 B2 * | 3/2011 | Fan et al. ..................... 370/389 |
| 8,090,256 B2 * | 1/2012 | Reisslein et al. ................... 398/3 |
| 2006/0188251 A1 * | 8/2006 | Chan et al. ..................... 398/4 |
| 2006/0215544 A1 * | 9/2006 | Asa et al. .................... 370/216 |
| 2007/0264008 A1 * | 11/2007 | Zaacks et al. ..................... 398/3 |
| 2008/0063394 A1 * | 3/2008 | Chi .................................. 398/5 |
| 2008/0240710 A1 * | 10/2008 | Nishioka ........................... 398/5 |
| 2009/0207726 A1 * | 8/2009 | Thomson et al. ............. 370/216 |
| 2009/0310960 A1 * | 12/2009 | Xu ..................................... 398/4 |
| 2011/0236012 A1 * | 9/2011 | Wakabayashi ..................... 398/3 |

FOREIGN PATENT DOCUMENTS

| | | |
|---|---|---|
| JP | 06-097950 | 4/1994 |
| JP | 10-126350 | 5/1998 |
| JP | 2000-332805 | 11/2000 |

* cited by examiner

*Primary Examiner* — Kenneth N Vanderpuye
*Assistant Examiner* — Amritbir Sandhu
(74) *Attorney, Agent, or Firm* — Staas & Halsey LLP

(57) ABSTRACT

An optical transmission apparatus connected to an optical ring network stores identification information of an optical transmission apparatus as a communication partner predetermined on a communication path. Each optical transmission apparatus includes self identification information in header information of an optical signal having a working wavelength used in normal operation, and transmits the optical signal to one of the two optical ring networks transferring optical signals in mutually opposite directions. The optical transmission apparatus determines whether the identification information included in the header information of the received optical signal having the working wavelength matches pre-stored identification information. The optical transmission apparatus thus detects a fault that occurs by the communication path. The optical transmission apparatus having detected the fault requests the communication partner to transmit the optical signal on a backup wavelength in the optical ring network opposite in direction to the optical ring network in the normal operation.

8 Claims, 8 Drawing Sheets

OPTICAL RING NETWORK SYSTEM

CROSS-REFERENCE TO RELATED APPLICATION

This application is based upon and claims the benefit of priority of the prior Japanese Patent Application No. 2009-035641, filed on Feb. 18, 2009, the entire contents of which are incorporated herein by reference.

FIELD

The embodiments discussed herein are related to an optical ring network system and an optical transmission apparatus forming the optical ring network.

BACKGROUND

There is currently a growing need for high-speed and high-capacity communications. To meet such a need, a communication system of wavelength division multiplex (WDM) for transmitting multiplexed light rays is used. Available as one of the WDM communication systems is an optical ring network system including an optical ring network having optical transmission paths connected in a ring configuration. Even if a fault occurs in a part of the optical transmission paths, communications are maintained by switching from one communication line to another.

Several schemes of switching communication lines responding to an optical transmission path malfunction in the optical ring network have been proposed. For example, Japanese Laid-open Patent Publication No. 6-97950 discloses a first communication line switching scheme. In the first communication line switching scheme disclosed, each optical transmission apparatus connected to an optical ring network causes the same information to be carried on a first-wavelength optical signal and a second-wavelength optical signal. The optical transmission apparatus transmits the first-wavelength optical signal and the second-wavelength optical signal in mutually opposite directions over the optical ring network. During normal operation, the optical transmission apparatus selectively receives the first-wavelength signal. In the case of a malfunction, if the optical transmission apparatus does not receive the first-wavelength signal, the apparatus selectively receives the second-wavelength signal.

Japanese Laid-open Patent Publication No. 6-97950 also discloses a second switching scheme. In accordance with the second switching scheme disclosed, the optical transmission apparatus transmits information on the first-wavelength optical signal during normal operation. In the case of a malfunction, an optical transmission apparatus having detected the fault occurring in the optical transmission path adjacent thereto converts the optical signal from the first wavelength into the second wavelength. The optical transmission apparatus having detected the fault transmits the second-wavelength optical signal into the optical transmission path in the direction opposite to the incoming direction of the first-wavelength optical signal.

In accordance with a third switching scheme disclosed in Japanese Laid-open Patent Publication No. 2000-332805, an optical ring network is arranged for each wavelength. At each node, the optical signal of each wavelength is input to an allocated optical ring network. Upon detecting a malfunction in any optical ring network of the working wavelength, an optical ring apparatus connected to each node switches from the optical ring network currently transmitting the optical signal to the optical ring network for transmitting another wavelength.

In accordance with the first switching scheme, two-way channels on a single wavelength are always used in the optical ring network in order to transmit a single piece of information. The number of lines available on the optical ring network is limited to the number equal to or smaller than the number of wavelengths available on the optical ring network. In accordance with the second switching scheme, the optical transmission apparatus adjacent to the optical transmission line with a fault detects the fault and then loops back the optical signal. The optical signal thus is transferred twice along an optical communication path between the optical transmission apparatus having transmitted the optical signal to the optical ring network and the optical transmission apparatus having detected the fault. If a large number of optical transmission apparatuses are present over the communication path, or if the distance between the apparatuses is long, a transmission delay caused in a bypass communication line bypassing the fault increases. The optical ring network of the third switching scheme includes a backup optical transmission line that is not used during normal operation when the network is not malfunctioning. Each optical ring apparatus forming the network is provided with a wavelength switching function and a branching function corresponding to all wavelengths used in the network system. The cost of the optical ring network system is thus high.

SUMMARY

According to an aspect of the embodiment, there is provided an optical ring network system including: a first optical transmission line on which optical signals are transmitted in a first direction, being formed to a ring; a second optical transmission line on which optical signals are transmitted in a second direction of an opposite direction as the first direction, being formed to the ring; a first optical transmission apparatus connecting to the first optical transmission line and the second optical transmission line, being operable to transmit a first optical signal including a transmission source identifier indicating a transmission source of a transmitted signal, the first optical signal being on a first wavelength, transmitted to a first communication path formed on the first optical transmission line and the second optical transmission line; and a second optical transmission apparatus connecting to the first optical transmission line and the second optical transmission line, being operable to determine whether the transmission source identifier included in the first optical signal received over the first communication path matches a pre-stored reception expectation optical path identifier indicating an optical transmission apparatus of a communication partner; wherein the second optical transmission apparatus is operable to transmit a second optical signal including a switch request signal to request that the transmitted signal is transmitted to a second communication path in an opposite direction as the first communication path, of the first optical transmission apparatus, the second optical signal being on the first wavelength, transmitted to the first communication path, and operable to receive a third optical signal on a second wavelength over the second communication path transmitted from the first optical transmission apparatus, in case of one of that the transmission source identifier differs from the reception expectation optical path identifier and that the transmission source identifier is not detected in the first optical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

An optical ring network system of a first embodiment is described below with reference to the drawings.

In the optical ring network system, an optical transmission apparatus connected to an optical ring network stores identification information of an optical transmission apparatus as a communication partner predetermined on a communication path. Each optical transmission apparatus includes self identification information in header information of an optical signal having a currently operative (working) wavelength used in normal operation, and transmits the optical signal to one of the two optical ring networks transferring optical signals in mutually opposite directions. The optical transmission apparatus determines whether the identification information included in the header information of the received optical signal having the currently operative (working) wavelength matches pre-stored identification information. The optical transmission apparatus thus detects a fault that occurs by the optical transmission line of the communication path. The optical transmission apparatus having detected the fault requests the optical transmission apparatus of the communication partner to transmit the optical signal on a backup wavelength in the optical ring network opposite in direction to the optical ring network in the normal operation.

Figure 1:
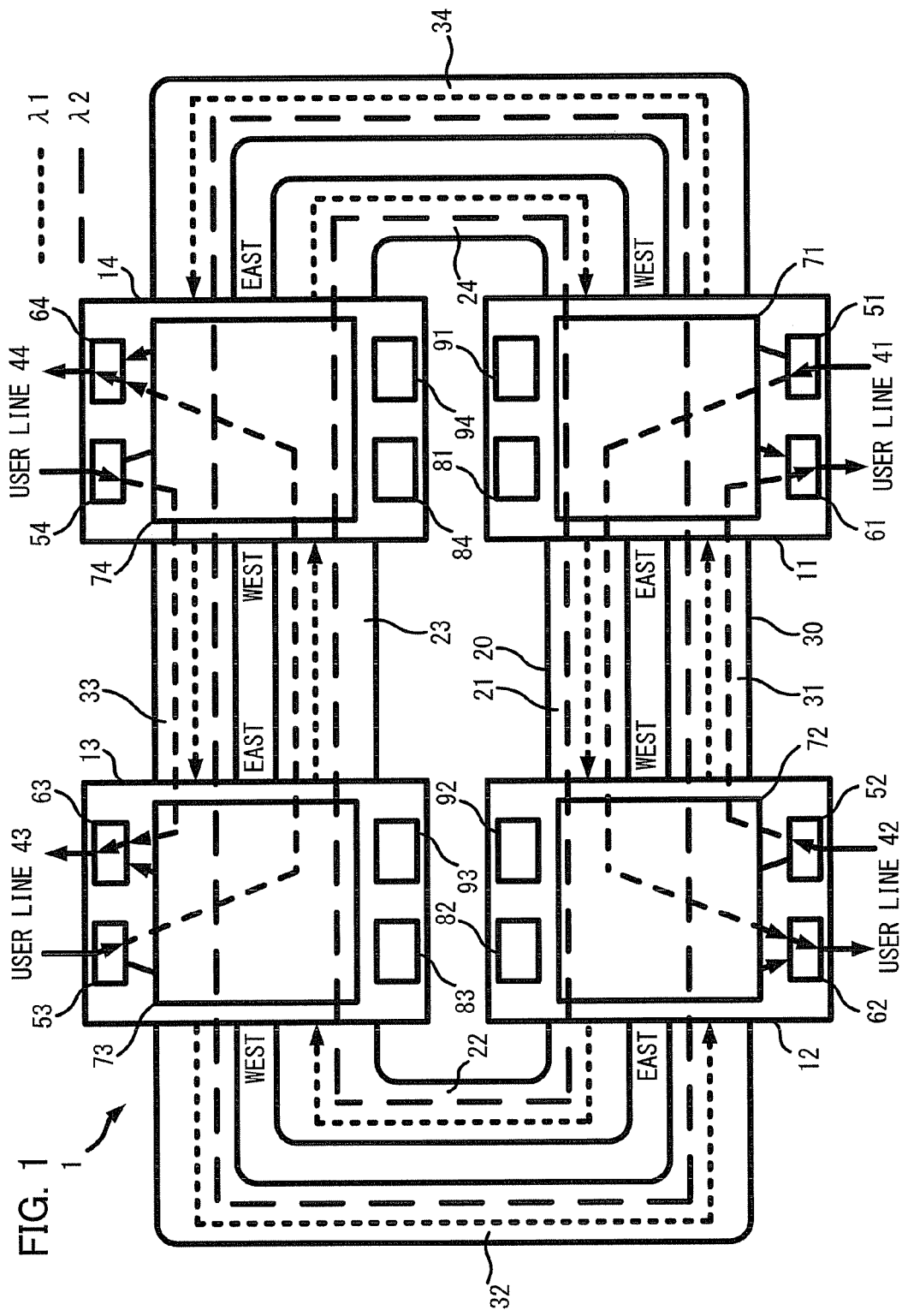
FIG. 1 is a block diagram illustrating an optical ring network system in accordance with a first embodiment.

FIG. 1 is a block diagram illustrating an optical ring network system 1 of the first embodiment. Referring to FIG. 1, the optical ring network system 1 includes four optical transmission apparatuses 11-14. The optical transmission apparatuses 11-14 are connected with one apparatus to adjacent apparatus via four pairs of optical fiber cables 21 and 31, . . . , 24 and 34. The optical fiber cables 21-24, each having at least one optical fiber, form a ring optical transmission line 20 that allows an optical signal to transfer clockwise. The optical fiber cables 31-34, each having at least one optical fiber, form a ring optical transmission line 30 that allows an optical signal to transfer counterclockwise. The two optical transmission lines have multiplexed optical channels with light having a plurality of different wavelengths serving as carrier waves.

The optical transmission apparatuses 11-14 are respectively connected to at least user lines 41-44. The user lines 41-44 are a communication line satisfying predetermined communication standards such as synchronous optical network (SONET)/synchronous digital hierarchy (SDH). The optical ring network system 1 illustrated in FIG. 1 includes, between the user line 41 and the user line 42, a communication path extending through the optical transmission apparatus 11 and the optical transmission apparatus 12. In the communication path, an optical signal output from the optical transmission apparatus 11 transfers through the clockwise optical transmission line 20 and reaches the optical transmission apparatus 12. On the other hand, an optical signal output from the optical transmission apparatus 12 transfers through the counterclockwise optical transmission line 30 and then reaches the optical transmission apparatus 11. Similarly, a communication path extending through the optical transmission apparatus 13 and the optical transmission apparatus 14 is set up between the user line 43 and the user line 44. In this communication path, an optical signal output from the optical transmission apparatus 13 transfers through the clockwise optical transmission line 20 and reaches the optical transmission apparatus 14. On the other hand, an optical signal output from the optical transmission apparatus 14 transfers through the counterclockwise optical transmission path 30 and reaches the optical transmission apparatus 13.

Since the two communication paths do not overlap each other in the optical transmission lines 20 and 30, the optical transmission apparatuses communicate with each other by an optical channel having the same wavelength $\lambda_1$. The communication paths share an optical channel having a wavelength $\lambda_2$ as a backup optical channel. If the communication paths do not overlap each other, a plurality of communication paths are established using the optical channel having the same wavelength. The optical ring network system 1 thus allows communication paths of the number greater than the number of wavelengths to be set. The optical transmission apparatus 11 includes at least one optical ring transmitting unit 51, at least one optical ring receiving unit 61, a cross-connect unit 71, a storage unit 81, and a controller 91. Similarly, the optical transmission apparatuses 12-14 include optical ring transmitting units 52-54, optical ring receiving units 62-64, cross-connect units 72-74, storage units 82-84, and controllers 92-94, respectively. Since the optical transmission apparatuses 11-14 are identical in structure and function to each other, only the optical transmission apparatus 11 is described below. For convenience of explanation, a terminal connected to an optical fiber cable extending clockwise on each optical transmission apparatus is referred to as an east terminal, and a terminal connected to an optical fiber cable extending counterclockwise on each optical transmission apparatus is referred to as a west terminal.

Figure 2:
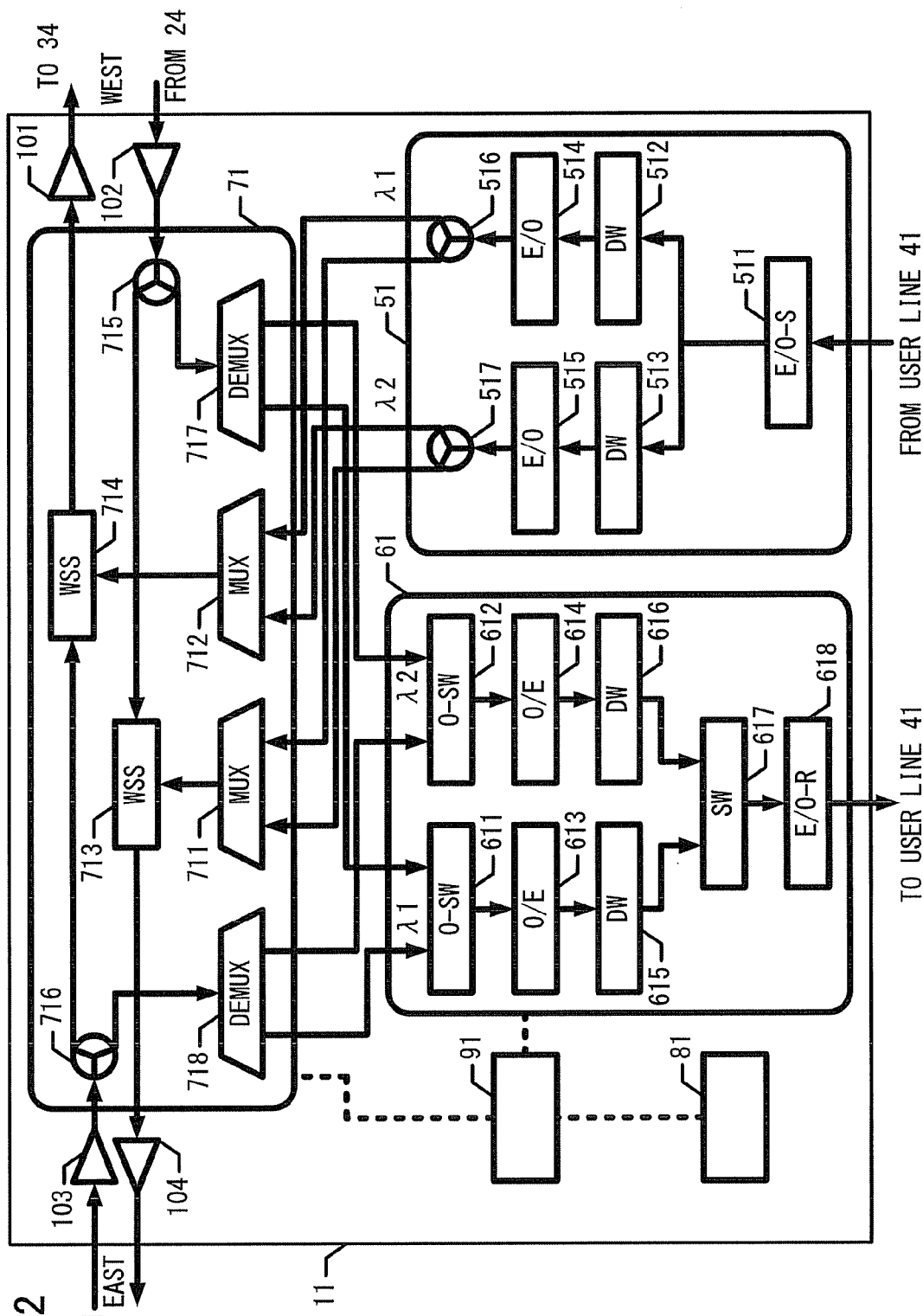
FIG. 2 is a block diagram illustrating an optical transmission apparatus connected to the optical ring network system illustrated in FIG. 1.

FIG. 2 is a block diagram illustrating an optical transmission apparatus 11 connected to the optical ring network system illustrated in FIG. 1 Referring to FIG. 2, one optical ring transmitting unit 51 and one optical ring receiving unit 61 are illustrated for simplicity of explanation. It is perfectly acceptable that the optical transmission apparatus 11 includes a plurality of optical ring transmitting units 51 and a plurality of optical ring receiving units 61.

The optical ring transmitting unit 51 receives an optical signal from the user line 41. The optical ring transmitting unit 51 includes data in the optical signal received from the user line 41 into an optical signal to be transmitted to one of the optical transmission line 20 or 30. For this operation, the optical ring transmitting unit 51 includes optical-electrical converter (O/E-S) 511, digital wrappers (DW) 512 and 513, electrical-optical converters (E/O) 514 and 515, and beam splitters 516 and 517 as illustrated in FIG. 2. The digital wrapper (DW) 512, the electrical-optical converter (E/O) 514 and the beam splitter 516 perform a process for an optical channel on the currently operative (working) wavelength $\lambda_1$ for use in the communication path during normal operation. On the other hand, the digital wrapper (DW) 513, the electrical-optical converter (E/O) 515, and the beam splitter 517 perform a process for an optical channel on a backup wavelength $\lambda_2$ for use in a bypass communication path that is established during malfunction.

The optical-electrical converter (O/E-S) 511 includes an optical receiving element such as a photodiode, and an amplifier circuit connected to the optical receiving element. The optical-electrical converter (O/E-S) 511 converts the optical signal received via the user line 41 into an electrical signal. The optical-electrical converter (O/E-S) 511 then outputs the electrical signal to the digital wrapper (DW) 512 and the digital wrapper (DW) 513.

The digital wrappers (DW) 512 and 513 includes, in a frame serving as a transmission unit of optical signal, data contained in the received electrical signal, an error correction code such as a forward error correction (FEC) code, and header information complying with the predetermined communication standards. For example, the International Telecommunication Union—Telecommunication Standardization Sector G. 709 (ITU-T G. 709) is one of the predetermined communication standards. The digital wrappers (DW) 512 and 513 set, on the header information, identification information received via the storage unit 81 and the controller 91 and identifying the optical transmission apparatus 11 from the other optical transmission apparatuses. The digital wrappers (DW) 512 and 513 further set on the header information a switch request flag representing whether to request the optical transmission apparatus as a communication partner to switch communication paths. For example, the digital wrappers (DW) 512 and 513 set the identification information of the optical transmission apparatus 11 and the switch request flag on an undefined region of the header information specified in ITU-T G.709. The identification information of the optical transmission apparatus 11 and the switch request flag set on the header information are used to switch the communication paths in the event of a fault occurring in part of the optical transmission line. The switching process of the communication path is described later. The digital wrappers (DW) 512 and 513 may be an integrated circuit performing a process defined in the ITU-T G.709. The digital wrapper (DW) 512 outputs the produced frame to the electrical-optical converter (E/O) 514. The digital wrapper (DW) 513 outputs the produced frame to the electrical-optical converter (E/O) 515.

The electrical-optical converter (E/O) 514 converts the received frame into an optical signal on the currently operative (working) wavelength $\lambda_1$. The electrical-optical converter (E/O) 515 converts the received frame into an optical signal on the backup wavelength $\lambda_2$. The electrical-optical converters (E/O) 514 and 515 each have a laser diode and an optical modulator for modulating light output from the laser diode according to the value of the signal contained in the frame. The electrical-optical converter (E/O) 514 then outputs the optical signal on the currently operative (working) wavelength $\lambda_1$ to the beam splitter 516. The electrical-optical converter (E/O) 515 outputs the optical signal on the backup wavelength $\lambda_2$ to the beam splitter 517.

The beam splitter 516 then splits the optical signal on the currently operative (working) wavelength $\lambda_1$ into an optical signal to be transmitted to the clockwise optical transmission line 20 and an optical signal to be transmitted to the counterclockwise optical transmission line 30. The beam splitter 517 splits the optical signal on the backup wavelength $\lambda_2$ into an optical signal to be transmitted to the clockwise optical transmission line 20 and an optical signal to be transmitted to the counterclockwise optical transmission line 30. The optical signals output from one of the beam splitters 516 and 517 are input to the cross-connect unit 71.

The cross-connect unit 71 multiplexes the optical signals received from the optical ring transmitting unit 51 and outputs the multiplexed optical signals to one of the optical transmission lines 20 and 30. The cross-connect unit 71 relays or receives the multiplexed optical signal traveling through one of the optical transmission lines 20 and 30. The cross-connect unit 71 demultiplexes the multiplexed optical signal received via one of the optical transmission lines 20 and 30 into the optical signals on the respective wavelengths, and then output the demultiplexed optical signals to the optical ring receiving unit 61. For this operation, the cross-connect unit 71 includes multiplexers (MUX) 711 and 712, wavelength selection switches (WSS) 713 and 714, beam splitters 715 and 716, and demultiplexers (DEMUX) 717 and 718 as illustrated in FIG. 2.

The multiplexer (MUX) 711 multiplexes the optical signals received from at least one optical ring transmitting unit 51. The multiplexer (MUX) 711 then outputs the multiplexed signals to the wavelength selection switch (WSS) 713 arranged on the clockwise optical transmission line 20. The multiplexer (MUX) 712 multiplexes the optical signals received from at least one optical ring transmitting unit 51. The multiplexer 712 then outputs the multiplexed signals to the wavelength selection switch (WSS) 714 arranged on the counterclockwise optical transmission line 30.

The wavelength selection switch (WSS) 713 separates an optical signal on a per wavelength basis from the wavelength-multiplexed optical signal received via the optical fiber cable 24 contained in the clockwise optical transmission line 20 connected to the input terminal of the wavelength selection switch (WSS) 713 or received from the multiplexer (MUX) 711. The wavelength selection switch (WSS) 713 selects an optical signal on any wavelength in response to a control signal from the controller 91. The wavelength selection switch (WSS) 713 outputs the optical signal on the selected wavelength to the optical fiber cable 21 contained in the optical transmission line 20 connected to the output terminal of the wavelength selection switch (WSS) 713. The wavelength selection switch (WSS) 714 separates an optical signal on a per wavelength basis from the wavelength-multiplexed optical signal received via the optical fiber cable 31 contained in the optical transmission line 30 connected to the input terminal of the wavelength selection switch (WSS) 714 or received from the multiplexer (MUX) 712. The wavelength selection switch (WSS) 714 selects an optical signal on any wavelength in response to a control signal from the controller 91. The wavelength selection switch (WSS) 714 outputs the optical signal on the selected wavelength to the optical fiber cable 34 contained in the optical transmission line 30 connected to the output terminal of the wavelength selection switch (WSS) 714.

The beam splitter 715 splits a wavelength-multiplexed optical signal received via the optical fiber cable 24 contained in the optical transmission line 20 into an optical signal traveling toward the wavelength selection switch (WSS) 713 and an optical signal traveling toward the demultiplexer (DEMUX) 717. The beam splitter 716 splits a wavelength-multiplexed optical signal received via the optical fiber cable 31 contained in the optical transmission line 30 into an optical signal traveling toward the wavelength selection switch (WSS) 714 and an optical signal traveling toward the demultiplexer (DEMUX) 718. The demultiplexers (DEMUX) 717 and 718 demultiplex the wavelength-multiplexed optical signals received from the beam splitters 715 and 716, respectively, into optical signals on a per wavelength basis. The demultiplexers (DEMUX) 717 and 718 output the optical signals on the respective wavelengths to the optical ring receiving unit 61 of the respective wavelength.

The optical transmission apparatus 11 includes optical amplifiers 101-104 connected to the optical transmission lines 20 and 30 at the input and output of the cross-connect unit 71. The optical amplifiers 101-104 amplify the optical signals traveling through the optical transmission lines 20 and 30. The optical amplifiers 101-104 may be optical fiber amplifiers doped with rare earth such as erbium or neodymium.

The optical ring receiving unit 61 extracts data from the optical signal received from the cross-connect unit 71, and transmits the extracted data to the user line 41 in accordance with the predetermined communication standard. As illustrated in FIG. 2, the optical ring receiving unit 61 includes optical switches (O-SW) 611 and 612, optical-electrical converters (O/E) 613 and 614, digital wrappers (DW) 615 and 616, switch circuit (SW) 617, and electrical-optical converter (E/O-R) 618. The optical switch (O-SW) 611, the optical-electrical converter (O/E) 613, and the digital wrapper (DW) 615 perform a process for an optical channel on the currently operative (working) wavelength $\lambda_1$. On the other hand, the optical switch (O-SW) 612, the optical-electrical converter (O/E) 614, and the digital wrapper (DW) 616 perform a process for an optical channel on the backup wavelength $\lambda_2$.

In response to a control signal from the controller 91, the optical switch (O-SW) 611 selects between the optical signal on the currently operative (working) wavelength $\lambda_1$ having traveled through the clockwise optical transmission line 20 and the demultiplexer (DEMUX) 717 and the optical signal on the currently operative (working) wavelength $\lambda_1$ having traveled through the counterclockwise optical transmission line 30 and the demultiplexer (DEMUX) 718. The optical switch (O-SW) 611 then outputs the selected optical signal to the optical-electrical converter (O/E) 613. In response to a control signal from the controller 91, the optical switch (O-SW) 612 selects between the optical signal on the backup wavelength $\lambda_2$ having traveled through the clockwise optical transmission line 20 and the demultiplexer (DEMUX) 717 and the optical signal on the backup wavelength $\lambda_2$ having traveled through the counterclockwise optical transmission line 30 and the demultiplexer (DEMUX) 718. The optical switch (O-SW) 612 then outputs the selected optical signal to the optical-electrical converter (O/E) 614.

The optical-electrical converter (O/E) 613, including a light receiving element such as a photodiode and an amplifier connected to the light receiving element, converts the optical signal received from the optical switch (O-SW) 611 into an electrical signal. The optical-electrical converter (O/E) 613 then outputs the electrical signal to the digital wrapper (DW) 615. Similarly, the optical-electrical converter (O/E) 614, including a light receiving element such as a photodiode and an amplifier connected to the light receiving element, converts the optical signal received from the optical switch (O-SW) 612 into an electrical signal. The optical-electrical converter (O/E) 614 then outputs the electrical signal to the digital wrapper (DW) 616.

The digital wrappers (DW) 615 and 616 extract data from the frame contained in the electrical signal received from the optical-electrical converters (O/E) 613 and 614, respectively. The digital wrappers (DW) 615 and 616 perform an error correction process on the extracted data. The digital wrappers (DW) 615 and 616 may be an integrated circuit that performs a process complying with the ITU-T G.709. The digital wrappers (DW) 615 and 616 organize the extracted data into a signal in a format satisfying the communication standard of the user line 41, and then outputs the resulting signal to the switch circuit (SW) 617. The digital wrappers (DW) 615 and 616 extract, from the header information contained in the frame, the identification information identifying the optical transmission apparatus of the communication partner and the switch request flag. The digital wrappers (DW) 615 and 616 send to the controller 91 the extracted identification information and switch request flag. If the digital wrappers (DW) 615 and 616 fail to extract the identification information of the optical transmission apparatus of the communication partner, the digital wrappers (DW) 615 and 616 send an error occurrence signal to the controller 91. The identification information of the optical transmission apparatus of the communication partner extracted from the header information of the received optical signal is hereinafter referred to as a transmission source identifier.

The switch circuit 617 (SW) selects one of the signals received from the digital wrappers (DW) 615 and 616 in response to a control signal from the controller 91, and sends the selected electrical signal to the electrical-optical converter (E/O-R) 618.

The electrical-optical converter (E/O-R) 618 converts the signal received from the switch circuit (SW) 617 into a signal in format satisfying the communication standard supported by the user line 41. The electrical-optical converter (E/O-R) 618 includes a laser diode and an optical modulator that modulates light output from the laser diode with the value of a signal received from the switch circuit (SW) 617. The electrical-optical converter (E/O-R) 618 outputs the resulting optical signal to the user line 41.

The storage unit 81 includes a nonvolatile semiconductor memory. The storage unit 81 stores the identification information of own apparatus, namely, the optical transmission apparatus 11. The storage unit 81 stores identification information of an optical transmission apparatus of a preset communication partner with an optical channel on a wavelength for use in communication with the communication partner mapped to the identification information. The identification information of the communication partner is hereinafter referred to as a reception expectation optical path identifier.

The controller 91 includes at least one processor and a peripheral circuit for the processor. The controller 91 thus detects a fault if the fault occurs in the communication path set in the optical ring network system 1. Upon detecting the occurrence of a fault, the controller 91 switches between a communication path having a fault-affected point thereon and a bypass communication path.

In order to detect a fault, the controller 91 compares the transmission source identifier with the reception expectation optical path identifier identified by the optical channel on the currently operative (working) wavelength used in communications with the communication partner and stored on the storage unit 81. If the transmission source identifier matches the reception expectation optical path identifier, the controller 91 determines that no fault occurs in the communication path.

More specifically, the controller 91 determines that receiving condition is normal. On the other hand, if the transmission source identifier fails to match the reception expectation optical path identifier, or if the controller 91 receives the error occurrence signal from the optical ring receiving unit 61, the controller 91 determines that a fault has occurred in the communication path. More specifically, the controller 91 determines that the receiving condition is not normal. The controller 91 then transmits to the optical ring transmitting unit 51 a control signal instructing the optical transmission apparatus of the communication partner to set the value of the switch request flag to a value indicating the switching of communication paths. If the switch request flag extracted from the optical signal received from the optical ring receiving unit 61 has a value not requesting the switching of the communication paths, the communication path routed through the optical channel on the currently operative (working) wavelength $\lambda_1$ for use in normal operation is used as is. More specifically, the controller 91 determines that transmitting condition is normal. If the switch request flag has a value requesting the switching of the communication paths, the controller 91 determines that the transmitting condition is not normal. In addition to the optical signal on the currently operative (working) wavelength $\lambda_1$, the controller 91 outputs the optical signal on the backup wavelength $\lambda_2$ to the communication path opposite in direction to the communication path normally used, using the cross-connect unit 71.

The following table 1 lists the relationship between the states of the currently operative (working) communication path for normal operation and the operational state of each element of the optical transmission apparatus 11.

TABLE 1

| | Operation | | |
|---|---|---|---|
| States of working communication paths | Optical ring RX unit (optical channel selection) | Optical ring TX unit (transmission of switch request) | Connection status of backup optical channel of cross-connect unit |
| Normal | Working | Without request | TX: thru RX: thru |
| TX error | Working | Without request | TX: optical ring TX unit RX: thru |
| RX error | Backup | With request | TX: optical ring TX unit RX: optical ring RX unit |

Note:
TX stands for transmission, RX for reception, and thru for direct passing through connection.

As listed in table 1, the optical ring receiving unit 61 selects the optical channel on the currently operative (working) wavelength $\lambda_1$ if the currently operative (working) communication line is in normal operating condition. The optical ring receiving unit 61 receives the optical signal having traveled through the optical channel on the currently operative (working) wavelength $\lambda_1$ and transmits the data contained in the optical signal to the user line 41. The optical ring transmitting unit 51 sets the value of the switch request flag to be the value not requesting the optical transmission apparatus 12 to switch the communication paths. In the cross-connect unit 71, the wavelength selection switch (WSS) 714 used to transmit the optical signal from the optical transmission apparatus 11 during a bypass communication path setting operation is set to cause the optical signal in the optical channel on the backup wavelength $\lambda_2$ to pass directly through the optical transmission apparatus 11. The wavelength selection switch (WSS) 713 set in the path for receiving the optical signal from the optical transmission apparatus 12 during the bypass communication path setting operation is set to cause the optical signal in the optical channel on the backup wavelength $\lambda_2$ to pass directly through the optical transmission apparatus 11.

The communication status of the working communication path may be in a transmission error in which the optical signal output from the optical transmission apparatus 11 fails to reach the optical transmission apparatus 12 as the communication partner. In such a case, the optical ring receiving unit 61 still selects the optical channel on the currently operative (working) wavelength $\lambda_1$. The optical ring receiving unit 61 receives the optical signal having traveled through the optical channel on the currently operative (working) wavelength $\lambda_1$ and then transmits the data contained in the optical signal to the user line 41. The optical ring transmitting unit 51 sets the value of the switch request flag to be the value not to request the optical transmission apparatus 12 as the communication partner to switch the communication paths. In the cross-connect unit 71, the wavelength selection switch (WSS) 714 which is used to transmit the optical signal from the optical transmission apparatus 11 during the bypass communication line setting operation is set to cause the optical signal on the backup wavelength $\lambda_2$ output from the optical ring transmitting unit 51 to transmit to the optical transmission line 30. The wavelength selection switch (WSS) 713 which is in the line for receiving the optical signal from the optical transmission apparatus 12 during the bypass communication path setting operation is set to cause the optical signal in the optical channel on the backup wavelength $\lambda_2$ to pass directly through the optical transmission apparatus 11.

The communication status of the working communication path may be in a reception error in which the optical signal output from the optical transmission apparatus 12 and having traveled through the currently operative (working) communication path fails to reach the optical transmission apparatus 11. In such a case, the optical ring receiving unit 61 selects the optical channel on the backup wavelength $\lambda_2$. The optical ring receiving unit 61 receives the optical signal having traveled through the optical channel on the backup wavelength $\lambda_2$, and transmits the data contained in the optical signal to the user line 41. The optical ring transmitting unit 51 then sets the value of the switch request flag to be the value requesting the optical transmission apparatus 12 as the communication partner to switch the communication path. In the cross-connect unit 71, the wavelength selection switch 714 which is used to transmit the optical signal from the optical transmission apparatus 11 during the bypass communication path setting operation is set to transmit the optical signal on the backup wavelength $\lambda_2$ from the optical ring transmitting unit 51 to the optical transmission line 30. The wavelength selection switch (WSS) 713 which is in the line for receiving the optical signal from the optical transmission apparatus 12 during the bypass communication line setting operation is set to cause the optical signal on the backup wavelength $\lambda_2$ output from the optical ring transmitting unit 51 to output to the optical transmission line 20.

Figure 3:
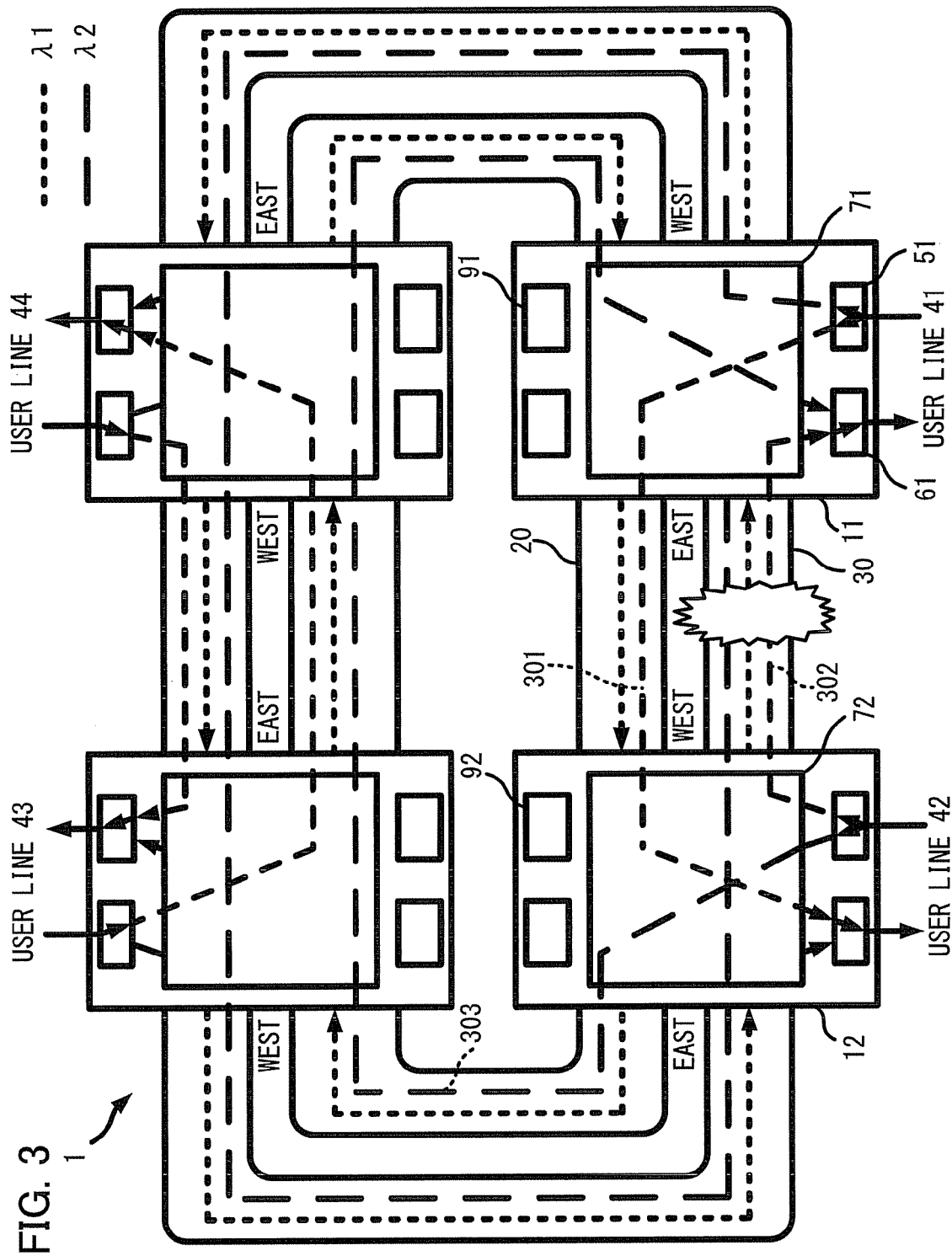
FIG. 3 is a diagram illustrating the optical ring network illustrated in FIG. 1 wherein one of the two optical transmission lines as a communication path formed between two optical transmission apparatuses malfunctions.
Figure 4:
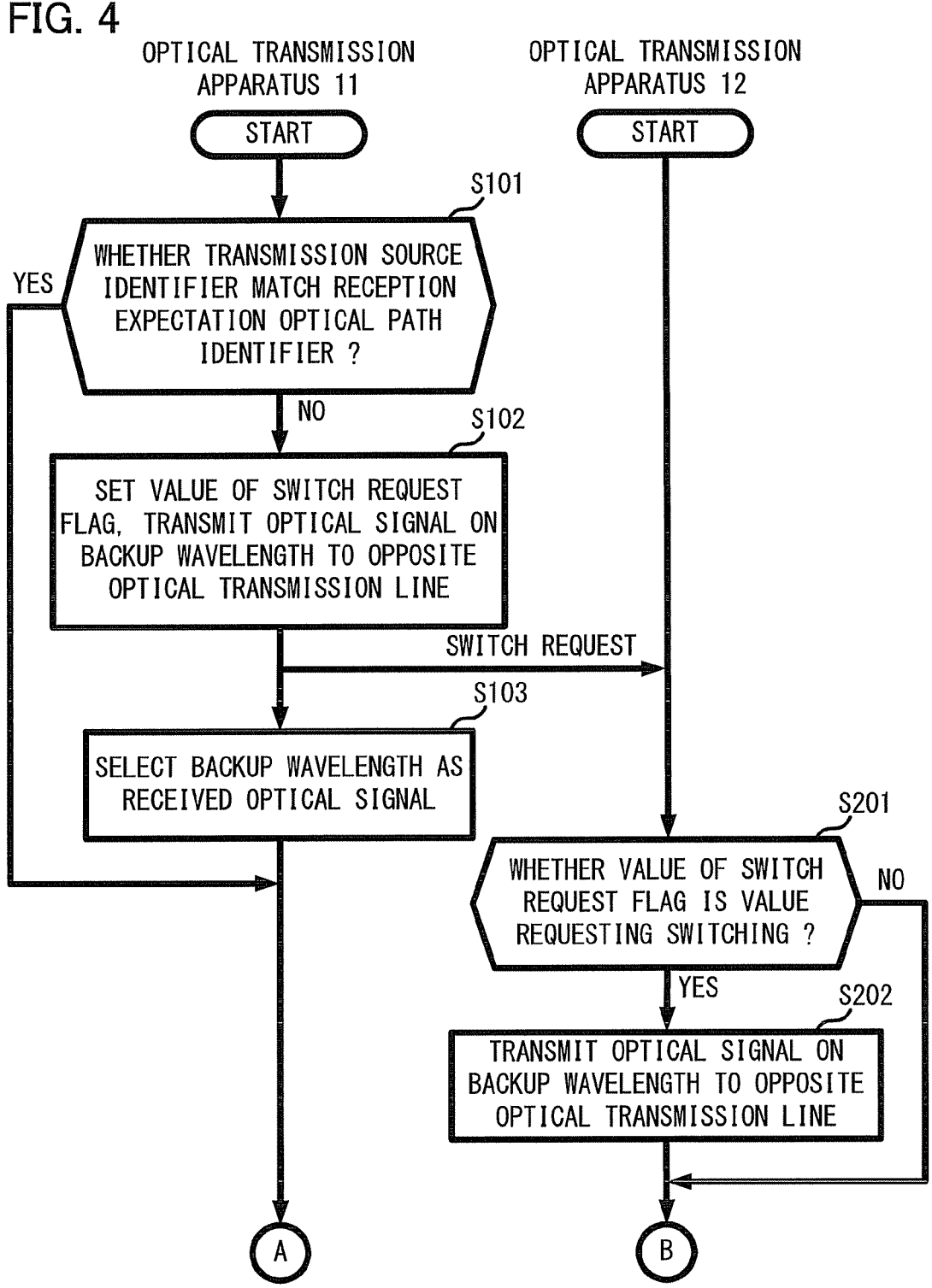
FIG. 4 is a flowchart of a communication path switching process of the two optical transmission apparatuses that are connected to the optical ring network illustrated in FIG. 1.
Figure 5:
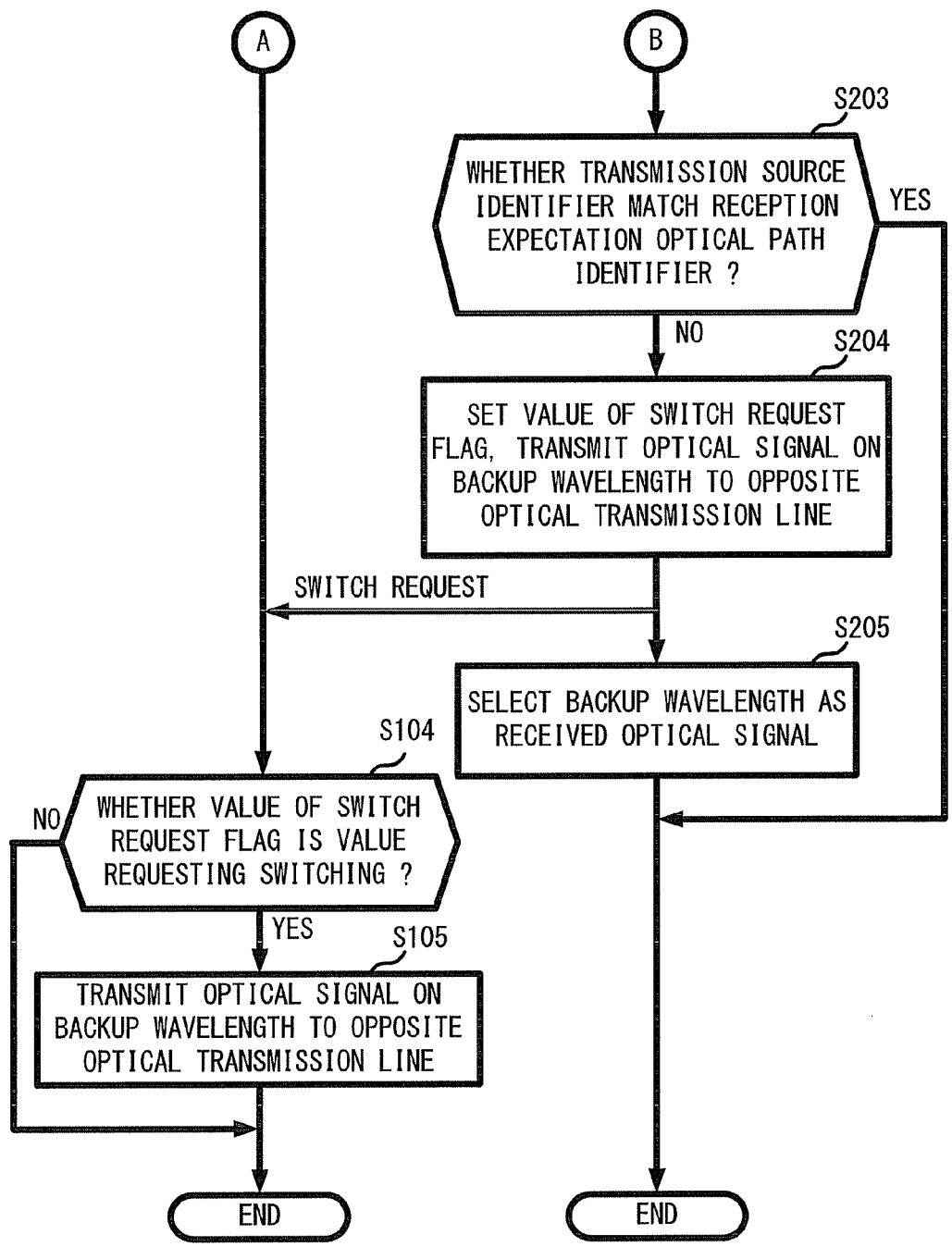
FIG. 5 is a flowchart of a continuation of the process illustrated in FIG. 4.

The communication path switching process of the optical transmission apparatus in response to a fault occurring in the communication path is described below with reference to FIGS. 3-5. FIG. 3 is a diagram illustrating the optical ring network system 1 in which a fault occurs in the communication path extending between the optical transmission apparatus 11 and the optical transmission apparatus 12 on the counterclockwise optical transmission line 30. FIGS. 4 and 5 are a flowchart of a communication path switching process of the optical ring network system 1 illustrated in FIG. 1 in which the optical transmission apparatuses 11 and 12 switch the communication paths.

Even if a fault occurs in the optical transmission line 30 as illustrated in FIG. 3, an optical signal 301 on the currently operative (working) wavelength $\lambda_1$ output from the optical transmission apparatus 11 reaches the optical transmission apparatus 12. If the fault occurs in the optical transmission line 30, however, an optical signal 302 on the currently operative (working) wavelength $\lambda_1$ output from the optical transmission apparatus 12 fails to reach the optical transmission apparatus 11.

Referring to FIG. 4, the controller 91 in the optical transmission apparatus 11 determines whether the transmission source identifier extracted from the optical signal received via the optical transmission line 30 as the communication path for standard operation matches the reception expectation optical path identifier (step S101). If the communication path is normal with no fault occurring therein, the transmission source identifier matches the reception expectation optical path identifier (YES in step S101). The controller 91 skips steps S102 and S103. Since the optical signal 302 does not reach the optical transmission apparatus 11 as illustrated in FIG. 3, the optical ring receiving unit 61 fails to extract the transmission source identifier, and sends the error occurrence signal to the controller 91. The transmission source identifier does not match the reception expectation optical path identifier (NO in step S101). The controller 91 causes the optical ring transmitting unit 51 to set the value of the switch request flag to be the value requesting the optical transmission apparatus as the communication partner to switch the communication paths (step S102). The header of the optical signal on the currently operative (working) wavelength $\lambda_1$ output from the optical transmission apparatus 11 and reaching the optical transmission apparatus 12 via the optical transmission line 20 contains the switch request flag requesting the communication paths to be switched. The controller 91 causes the cross-connect unit 71 to transmit the optical signal 301 on the currently operative (working) wavelength $\lambda_1$ to the optical transmission line 20 and causes the cross-connect unit 71 to transmit the optical signal on the backup wavelength $\lambda_2$ containing the same data as the optical signal 301 to the optical transmission line 30. The controller 91 then controls the optical ring receiving unit 61 set to receive the optical signal on the currently operative (working) wavelength $\lambda_1$ so that the optical ring receiving unit 61 selects the backup wavelength $\lambda_2$ as a wavelength of an optical signal to be received (step S103). The optical ring receiving unit 61 operates the optical switches (O-SW) 611 and 612, and the switch circuit (SW) 617 so that the optical signal 303 on the backup wavelength $\lambda_2$ having traveled through the clockwise optical transmission line 20 is selectively received and so that the data contained in the optical signal 303 is transmitted to the user line 41.

The controller 92 in the optical transmission apparatus 12 determines whether the value of the switch request flag extracted from the optical signal on the currently operative (working) wavelength $\lambda_1$ received via the optical transmission line 20 as the communication path for the normal operation is the one requesting the communication path switching process to be performed (step S201). If the value of the switch request flag is not the value requesting the communication path switching process to be performed (NO in step S201), the controller 92 skips step S202. Referring to FIG. 3, the optical transmission apparatus 11 sets the value of the switch request flag to be the value requesting the optical transmission apparatus 12 to switch the communication paths (YES in step S201). The controller 92 thus controls the cross-connect unit 72, thereby not only transmitting the optical signal 302 on the currently operative (working) wavelength $\lambda_1$ but also transmitting the optical signal 303 on the backup wavelength $\lambda_2$ containing the same data as the optical signal 302 to the optical transmission line opposite in direction to the communication path for the normal operation (step S202). Referring to FIG. 3, the optical signal 303 on the backup wavelength $\lambda_2$ is transmitted from the optical transmission apparatus 12 to the optical transmission line 20.

As illustrated in FIG. 5, the controller 92 in the optical transmission apparatus 12 determines whether the transmission source identifier extracted from the optical signal received via the optical transmission line 20 as the communication path for the normal operation matches the reception expectation optical path identifier (step S203). Since no fault occurs in the communication path from the optical transmission apparatus 11 to the optical transmission apparatus 12 as illustrated in FIG. 3, the transmission source identifier matches the reception expectation optical path identifier (YES in step S203). The controller 92 ends the communication line switching process.

The controller 91 in the optical transmission apparatus 11 determines whether the value of the switch request flag extracted from the optical signal on the currently operative (working) wavelength $\lambda_1$ is the value requesting the communication path switching process to be performed (step S104). Since the optical transmission apparatus 11 does not receive the optical signal 302 on the currently operative (working) wavelength $\lambda_1$ as illustrated in FIG. 3, the switch request flag is not extracted (NO in step S104). The controller 91 thus ends the communication path switching process.

Through the series of process steps, the optical signal on the backup wavelength $\lambda_2$ output from the optical transmission apparatus 12 reaches the optical transmission apparatus 11 via the optical transmission line 20. On the other hand, the communication path extending from the optical transmission apparatus 11 to the optical transmission apparatus 12 for transmitting the optical signal on the currently operative (working) wavelength $\lambda_1$ is used as is. The optical ring network system 1 continuously keep established communications between the optical transmission apparatus 11 and the optical transmission apparatus 12 by switching only the communication paths allowing the optical signal from the optical transmission apparatus 12 to be transmitted.

Figure 6:
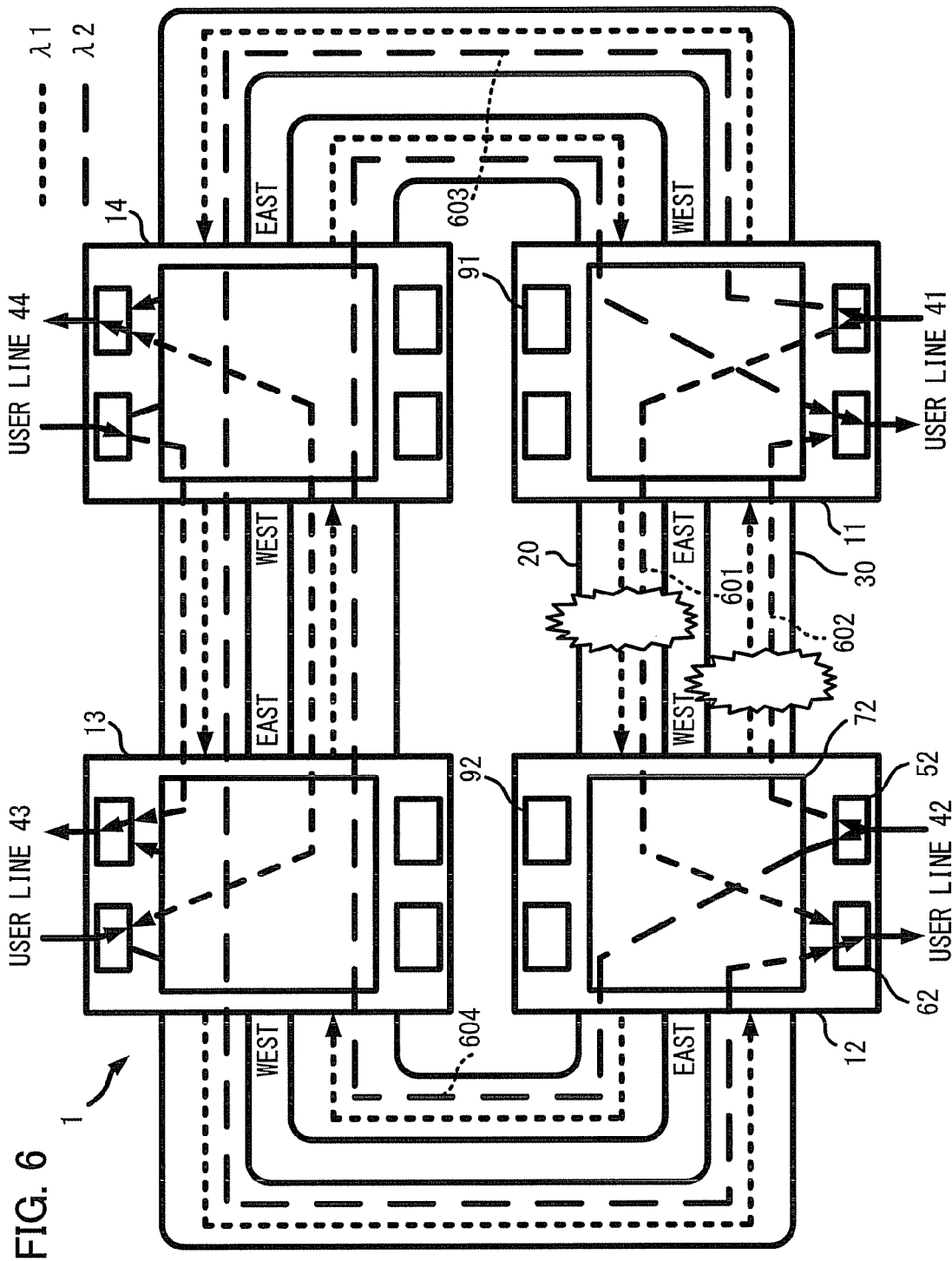
FIG. 6 is a diagram illustrating the optical ring network illustrated in FIG. 1 wherein the two-way optical transmission lines as a communication path formed between two optical transmission apparatuses malfunction.

FIG. 6 is a diagram illustrating the optical ring network system 1 in which faults occur in both communication paths established between the optical transmission apparatus 11 and the optical transmission apparatus 12 on the clockwise optical transmission line 20 and the counterclockwise optical transmission line 30. In this case, neither an optical signal 601 on the currently operative (working) wavelength $\lambda_1$ output from the optical transmission apparatus 11 nor an optical signal 602 on the currently operative (working) wavelength $\lambda_1$ output from the optical transmission apparatus 12 reach the optical transmission apparatuses of the respective communication partners. The communication path switching process for the optical transmission apparatus 11 and the optical transmission apparatus 12 in such a case is described with reference to FIGS. 4 and 5.

The process steps in steps S101-S103 and steps S201 and S202 remain unchanged from those illustrated in FIG. 3, and the discussion thereof is omitted here.

In step S203 in FIG. 5, a fault occurs in the communication path from the optical transmission apparatus 11 to the optical transmission apparatus 12 as illustrated in FIG. 6. The optical ring receiving unit 62, failing to extract the transmission source identifier, outputs an error occurrence signal to the controller 92. The transmission source identifier does not match the reception expectation optical path identifier (NO in step S203). The controller 92 thus causes the optical ring transmitting unit 52 to set the value of the switch request flag to be the value requesting the optical transmission apparatus as the communication partner to switch the communication paths (step S204). The controller 92 causes the cross-connect unit 72 to transmit the optical signal 602 on the currently operative (working) wavelength $\lambda_1$ to the optical transmission line 30 while also causing the cross-connect unit 72 to transmit an optical signal 604 on the backup wavelength $\lambda_2$ having the same data as the optical signal 602 to the optical transmission line 20. The controller 92 controls the optical ring receiving unit 62 set to receive the optical signal on the currently operative (working) wavelength $\lambda_1$ so that the optical ring receiving unit 62 selects the backup wavelength $\lambda_2$ as the wavelength of the optical signal to be received (step S205). The optical ring receiving unit 62 thus selectively receives the optical signal 603 on the backup wavelength $\lambda_2$ and transmits the data contained in the optical signal 603 to the user line 42. The controller 92 thus ends the communication path switching process.

The controller 91 in the optical transmission apparatus 11 determines whether the value of the switch request flag extracted from the optical signal 602 on the currently operative (working) wavelength $\lambda_1$ received via the optical transmission line 20 as the communication path for the normal operation is the value requesting the communication path switching process to be performed (step S104). Referring to FIG. 6, the optical transmission apparatus 11 fails to extract the switch request flag from the optical signal 602 on the currently operative (working) wavelength $\lambda_1$. The controller 91 thus ends the communication path switching process.

Through the above-described series of process steps, the optical signal 603 on the backup wavelength $\lambda_2$ output from the optical transmission apparatus 11 reaches the optical transmission apparatus 12 via the optical transmission line 30. The optical signal 604 on the backup wavelength $\lambda_2$ output from the optical transmission apparatus 12 reaches the optical transmission apparatus 11 via the optical transmission line 20. The optical ring network system 1 may thus maintain communications between the optical transmission apparatus 11 and the optical transmission apparatus 12 by switching the bi-directional communication paths.

The optical transmission apparatus 12 is already set to transmit the optical signal 604 on the backup wavelength $\lambda_2$ to the optical transmission path 20 in step S202 as illustrated in FIG. 6. In step S204, the optical transmission apparatus 12 does not switch the optical signals in practice. Similarly, in step S102, the optical transmission apparatus 11 is already set to transmit the optical signal 603 on the backup wavelength $\lambda_2$ to the optical transmission path 30. If a fault occurs in the communication path set up between the optical transmission apparatus 11 and the optical transmission apparatus 12 on only the optical transmission line 20, the optical transmission lines transmitting the optical signal therethrough are switched in steps S204 and S105.

If the optical transmission line 30 is restored from the status illustrated in FIG. 6, the optical transmission apparatus 11 may receive the optical signal 602 on the currently operative (working) wavelength $\lambda_1$ transmitted from the optical transmission apparatus 12 to the optical transmission line 30. The optical transmission apparatus 11 may thus extract the transmission source identifier from the optical signal 602. Since the transmission source identifier matches the reception expectation optical path identifier, the controller 91 in the optical transmission apparatus 11 determines that the receiving condition is thus normal. The controller 91 controls the optical ring receiving unit 61 so that the currently operative (working) wavelength $\lambda_1$ is selected as the wavelength of the optical signal to be received. The communication path from the optical transmission apparatus 12 to the optical transmission apparatus 11 is the communication path for the normal operation. The controller 91 causes the optical ring transmitting unit 51 to set the value of the switch request flag to be the value not requesting the optical transmission apparatus as the communication partner to switch the communication paths.

If the optical transmission line 20 is restored as well, the optical transmission apparatus 12 may receive the optical signal 601 on the currently operative (working) wavelength $\lambda_1$ transmitted from the optical transmission apparatus 11 to the optical transmission line 20. As a result, the optical transmission apparatus 12 may extract the transmission source identifier from the optical signal 601. Since the transmission source identifier matches the reception expectation optical path identifier, the controller 92 in the optical transmission apparatus 12 determines that the receiving condition is normal. The controller 92 controls the optical ring receiving unit 62 so that the currently operative (working) wavelength $\lambda_1$ is selected as the wavelength of the optical signal to be received. The communication path from the optical transmission apparatus 11 to the optical transmission apparatus 12 becomes the communication path for the normal operation. The switch request flag extracted from the optical signal 601 has the value not requesting the communication paths to be switched, and the optical transmission apparatus 12 stops transmitting the optical signal 604 on the backup wavelength $\lambda_2$. The controller 92 causes the optical ring transmitting unit 52 to set the value of the switch request flag to be the value not requesting the optical transmission apparatus as the communication partner to switch the communication paths. Since the value of the switch request flag extracted from the optical signal 602 has the value not requesting the communication paths to be switched in the optical transmission apparatus 11, the optical transmission apparatus 11 stops transmitting the optical signal 603 on the backup wavelength $\lambda_2$. Through the series of process steps, the optical ring network system 1 switches the communication between the optical transmission apparatus 11 and the optical transmission apparatus 12 to the communication path for the normal operation.

The following table 2 lists the settings of each optical transmission apparatus in the optical ring network system 1 when the communication path between the optical transmission apparatus 11 and the optical transmission apparatus 12 illustrated in FIG. 1 is normal. The following table 3 lists the settings of each optical transmission apparatus with a bypass communication path set up between the optical transmission apparatus 11 and the optical transmission apparatus 12 when the communication path in two ways between the optical transmission apparatus 11 and the optical transmission apparatus 12 suffers from faults.

TABLE 2

| | Optical transmission apparatuses | | | |
|---|---|---|---|---|
| | 11 | 12 | 13 | 14 |
| Working channel | East | West | East | West |
| Backup channel | Thru | Thru | Thru | Thru |
| TX source identifier | A | B | C | D |
| RX expectation optical path identifier | B | A | D | C |

TABLE 3

|  | Optical transmission apparatuses | | | |
| --- | --- | --- | --- | --- |
|  | 11 | 12 | 13 | 14 |
| Working channel | East | West | East | West |
| Backup channel | West | East | Thru | Thru |
| TX source identifier | A | B | C | D |
| RX expectation optical path identifier | B | A | D | C |

If the communication path between the optical transmission apparatus 11 and the optical transmission apparatus 12 is in normal operating condition as listed in table 2, the optical transmission apparatus 11 transmits and receives optical signals through the optical fiber cables 21 and 31 connected to the east terminals thereon via the optical channel on the currently operative (working) wavelength $\lambda_1$. The optical transmission apparatus 11 causes the optical signal on the optical channel on the backup wavelength $\lambda_2$ to pass directly therethrough. The optical transmission apparatus 11 then includes in the optical signal transmitted therefrom identification information "A" as the transmission source identifier identifying the optical transmission apparatus 11. The optical transmission apparatus 11 stores identification information "B" as the reception expectation optical path identifier identifying the optical transmission apparatus 12. The optical transmission apparatus 12 transmits and receives optical signals through the optical fiber cables 21 and 31 connected to the west terminals thereon via the optical signal on the currently operative (working) wavelength $\lambda_1$. The optical transmission apparatus 12 causes the optical signal on the optical channel on the backup wavelength $\lambda_2$ to pass directly therethrough. The optical transmission apparatus 12 includes in the optical signal transmitted therefrom the identification information "B" as the transmission source identifier identifying the optical transmission apparatus 12. The optical transmission apparatus 12 stores the identification information "A" as the reception expectation optical path identifier identifying the optical transmission apparatus 11.

The optical transmission apparatus 13 transmits and receives optical signal through the optical fiber cables 23 and 33 connected to the east terminals thereon via the optical channel on the currently operative (working) wavelength $\lambda$. The optical transmission apparatus 13 causes the optical signal on the optical channel on the backup wavelength $\lambda_2$ to pass directly therethrough. The optical transmission apparatus 13 includes in the optical signal transmitted therefrom identification information "C" as the transmission source identifier identifying the optical transmission apparatus 13. The optical transmission apparatus 13 also stores identification information "D" as the reception expectation optical path identifier identifying the optical transmission apparatus 14. Similarly, the optical transmission apparatus 14 transmits and receives optical signals through the optical fiber cables 23 and 33 connected to the west terminals thereon via the optical channel on the currently operative (working) wavelength $\lambda$. The optical transmission apparatus 14 causes the optical signal on the optical channel on the backup wavelength $\lambda_2$ to pass directly therethrough. The optical transmission apparatus 14 includes in the optical signal transmitted therefrom the identification information "D" as the transmission source identifier identifying the optical transmission apparatus 14. The optical transmission apparatus 14 also stores the identification information "C" as the reception expectation optical path identifier identifying the optical transmission apparatus 13.

If the bypass communication path is set up between the optical transmission apparatus 11 and the optical transmission apparatus 12 as listed in table 3, the optical transmission apparatus 11 transmits and receives optical signals through the optical fiber cables 24 and 34 connected to the west terminals thereon via the optical channel on the backup wavelength $\lambda_2$. Similarly, the optical transmission apparatus 12 transmits and receives optical signals through the optical fiber cables 22 and 32 connected to the east terminals thereon via the optical channel on the backup wavelength $\lambda_2$. The other settings remain unchanged to those listed in table 2.

In the optical ring network system 1 of the first embodiment as described above, the identification information of the optical transmission apparatus as the communication partner predetermined on the communication path is stored as the reception expectation optical path identifier. Each optical transmission apparatus includes own identification information as a transmission source identifier in the header information of the optical signal on the currently operative (working) wavelength used in the normal operation, and transmits the optical signal to the communication path used in the normal operation. The optical transmission apparatus determines whether the transmission source identifier included in the header information of the received optical signal on the currently operative (working) wavelength matches the reception expectation optical path identifier pre-stored. The optical transmission apparatus may thus detect the occurrence of a fault in the communication path on the optical transmission line. Upon detecting the fault, the optical transmission apparatus requests the optical transmission apparatus as the communication partner to transmit also the optical signal on the backup wavelength in the optical transmission line opposite in direction to the communication path for the normal operation. Since the optical ring network system transmits the optical signal in one direction only during the normal operation, a plurality of communication paths serving for the optical signals of the same wavelength are thus provided. Even if a fault occurs, the optical transmission apparatus as a signal transmission source switches the communication path transmitting the optical signal from one to another. The optical ring network system is thus free from a path where the signal travels twice. In the event of a fault, the optical ring network system controls a needless increase in the length of communication path, and thus controls a transmission delay. The optical ring network system is free from the need to arrange an optical transmission line used in the event of a fault separately from the optical transmission line used in the normal operation. An increase in installation costs of the optical ring network system is controlled.

In the event of a fault, the optical transmission apparatuses communicate with each other using the optical channel on the backup wavelength. Each optical transmission apparatus may include the transmission source identifier in the header information of the optical signal on the backup wavelength to be transmitted. The optical transmission apparatus determines whether the transmission source identifier extracted from the optical signal on the backup wavelength selectively received matches the reception expectation optical path identifier. If the transmission source identifier fails to match the reception expectation optical path identifier, each optical transmission apparatus may stop communications. Even if faults occur in a plurality of communication paths using channels on the same currently operative (working) wavelength, the optical ring network system prevents a signal of a wrong communication partner from being transmitted to the user line connected between the optical transmission apparatuses.

Faults may now occur in the communication path between the optical transmission apparatuses 11 and 12 and the communication path between the optical transmission apparatuses 13 and 14 in the optical ring network system 1 illustrated in FIG. 1. Each optical transmission apparatus transmits the optical signal on the same backup wavelength $\lambda_2$ to an optical transmission line opposite in direction to the communication path used in the standard operation. The optical signal on the backup wavelength $\lambda_2$ transmitted from the optical transmission apparatus 11 reaches the optical transmission apparatus 14.

The header information of the optical signal on the backup wavelength $\lambda_2$ transmitted from the optical transmission apparatus 11 includes the identification information of the optical transmission apparatus 11 as the transmission source identifier. The optical transmission apparatus 14 stores the identification information of the optical transmission apparatus 13 as the reception expectation optical path identifier. Since the transmission source identifier extracted from the optical signal on the backup wavelength $\lambda_2$ fails to match the reception expectation optical path identifier, the optical transmission apparatus 14 stops transmitting the optical signal thereof. In another optical transmission apparatus as well, the transmission source identifier extracted from the optical signal on the backup wavelength $\lambda_2$ fails to match the reception expectation optical path identifier, and the optical transmission apparatus stops transmitting the optical signal thereof. The optical ring network system prevents a signal of a wrong communication partner from being transmitted to the user line connected between the optical transmission apparatuses.

Second Embodiment

An optical ring network system 2 of a second embodiment is described below. During normal operation with no fault occurring in the communication paths, the optical ring network system 2 of the second embodiment sets up a communication path lower in priority than the other communication paths, using the optical signal on the backup wavelength. If a fault occurs in a communication path higher in priority in the optical ring network system 2, an optical transmission apparatus having detected the fault notifies the other optical transmission apparatuses of the fault through a service optical channel requesting the other optical transmission apparatuses not to use the low-priority communication path. The optical transmission apparatus using the communication path suffering from the fault sets a bypass communication path using the optical signal on the backup wavelength.

Figure 7:
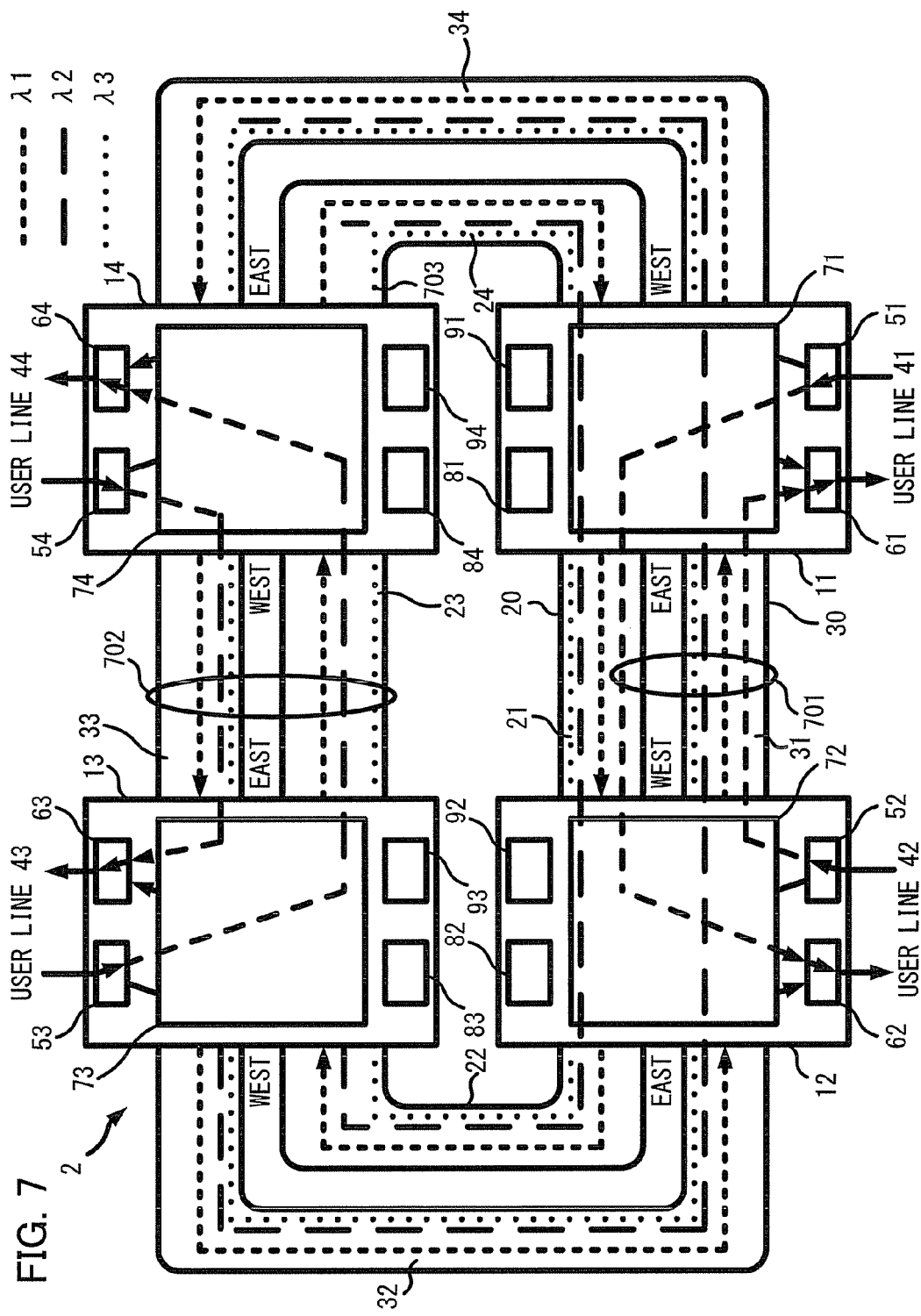
FIG. 7 is a block diagram illustrating an optical ring network system in accordance with a second embodiment.

FIG. 7 is a block diagram diagrammatically illustrating the optical ring network system 2 in accordance with the second embodiment. Elements in the optical ring network system 2 illustrated in FIG. 7 identical to those in the optical ring network system 1 illustrated in FIG. 1 are designated with the same reference numerals. The optical ring network system 2 is different from the optical ring network system 1 in that a communication path 702 between the user line 43 and the user line 44 is the optical channel on the wavelength $\lambda_2$ and in that the optical transmission apparatuses are connected to each other via a service optical channel 703 on wavelength $\lambda_3$. Each optical transmission apparatus has the same structure as the one illustrated in FIG. 2. The detailed discussion of the function and structure of the optical transmission apparatus is omitted here.

Waveform $\lambda_2$ used in the communication path 702 is the wavelength of the backup communication path for a communication path 701 that extends between the user line 41 and the user line 42 via the optical transmission apparatus 11 and the optical transmission apparatus 12. The communication path 702 between the optical transmission apparatus 13 and the optical transmission apparatus 14 is set to lower in priority than the communication path 701 between the optical transmission apparatus 11 and the optical transmission apparatus 12. The priority of each communication path is pre-stored in the storage unit in the optical transmission apparatus on which the communication path is set for example.

The service optical channel 703 may be the one complying with the standard of the optical supervisor channel (OSC). The controller in each optical transmission apparatus transmits to an optical transmission apparatus adjacent thereto control information and management information via the service optical channel 703.

A fault may occur in a communication path on an optical transmission line having a high priority in the optical ring network system 2. The switching process of the communication path by each optical transmission apparatus is described below. The principle and operation on which each optical transmission apparatus detects the fault in the optical ring network system 2 remain unchanged from the principle and operation on which each optical transmission apparatus detects the fault in the optical ring network system 1. Each optical transmission apparatus in the optical ring network system 2 determines whether the transmission source identifier extracted from the received optical signal matches the reception expectation optical path identifier. If the transmission source identifier fails to match the reception expectation optical path identifier, or if no transmission source identifier is extracted, each optical transmission apparatus determines that a fault occurs. Each optical transmission apparatus in the optical ring network system 2 may periodically transmit a keep-alive packet to the adjacent optical transmission apparatus via the service optical channel 703, and a fault may be determined to occur if such a keep-alive packet fails to be received.

Faults may now occur in the communication path 701 on the optical fiber cables 21 and 31 as illustrated in FIG. 7. Upon detecting the occurrence of a fault, the controller 91 in the optical transmission apparatus 11 checks the priority of the communication path 701 stored on the storage unit 81. The priority of the communication path 701 is high in FIG. 7. The controller 91 then transmits a reception error notification signal to the optical transmission apparatus 14 via the service optical channel 703 routed through an optical transmission line opposite in direction to the communication path 701. Upon receiving the reception error notification signal from the optical transmission apparatus 11, the controller 94 in the optical transmission apparatus 14 transfers the reception error notification signal to the optical transmission apparatus 13 via the service optical channel 703. The controller 94 in the optical transmission apparatus 14 controls the cross-connect unit 74, thereby causing the optical signal on the wavelength $\lambda_2$ received via the optical transmission line to pass directly therethrough. Similarly, upon receiving a reception error notification signal from the optical transmission apparatus 14, the controller 93 in the optical transmission apparatus 13 transfers the reception error notification signal to the optical transmission apparatus 12 via the service optical channel 703. The controller 93 in the optical transmission apparatus 13 controls the cross-connect unit 73, thereby causing the optical signal on the wavelength $\lambda_2$ received via the optical transmission line to pass directly therethrough.

If the optical transmission apparatus 14 causes the optical signal on the wavelength $\lambda_2$ to pass directly therethrough, the optical transmission apparatus 13 does not receive the optical signal on the wavelength $\lambda_2$ transmitted from the optical transmission apparatus 14, and fails to extract the transmission source identifier. If the optical transmission apparatus 13 fails to extract the transmission source identifier, the controller 93 in the optical transmission apparatus 13 checks the priority of the communication path 702 connected with the optical transmission apparatus 14 stored on the storage unit 83. Referring to FIG. 7, the priority of the communication path 702 is low. The controller 93 then stops transmitting the optical signal on the wavelength $\lambda_2$ to the optical transmission apparatus 14. Similarly, the optical transmission apparatus 14 become unable to receive the optical signal on the wavelength $\lambda_2$ from the optical transmission apparatus 13, and thus unable to extract the transmission source identifier. If the optical transmission apparatus 14 fails to extract the transmission source identifier, the controller 94 in the optical transmission apparatus 14 checks the priority of the communication path 702 stored on the storage unit 84. Since the priority of the communication path 702 is low, the controller 94 stops transmitting the optical signal on the wavelength $\lambda_2$ to the optical transmission apparatus 13.

The communication path 702 having a low priority set up between the optical transmission apparatus 13 and the optical transmission apparatus 14 is thus released. The optical transmission apparatus 11 and the optical transmission apparatus 12 may now transmit the optical signal on the wavelength $\lambda_2$ through the communication path via the optical transmission apparatuses 13 and 14. The optical transmission apparatus 11 thus controls the cross-connect unit 71 in order to transmit the optical signal on the wavelength $\lambda_2$ output from the optical ring transmitting unit 51 in an optical transmission line opposite in direction to the communication path 701. The controller 91 controls the optical ring receiving unit 61 set to receive the optical signal on the wavelength $\lambda_1$ so that the optical ring receiving unit 61 selectively receives the optical signal on the wavelength $\lambda_2$ via the communication path opposite in direction to the communication path 701. Similarly, the optical transmission apparatus 12 controls the cross-connect unit 72 in order to transmit the optical signal on the wavelength $\lambda_2$ output from the optical ring transmitting unit 52 in an optical transmission line opposite in direction to the communication path 701. The controller 92 controls the optical ring receiving unit 62 set to receive the optical signal on the wavelength $\lambda_1$ so that the optical ring receiving unit 62 selectively receives the optical signal on the wavelength $\lambda_2$ via the communication path opposite in direction to the communication path 701.

Through the above-described series of process steps, the optical signal on the wavelength $\lambda_2$ output from the optical transmission apparatus 11 reaches the optical transmission apparatus 12 via the optical transmission line 30. The optical signal on the wavelength $\lambda_2$ output from the optical transmission apparatus 12 reaches the optical transmission apparatus 11 via the optical transmission line 20. Communications between the optical transmission apparatus 11 and the optical transmission apparatus 12 are thus maintained by switching between the communication paths in the two directions.

Table 4 lists the settings of each optical transmission apparatus in the optical ring network system 2 when the communication path for the normal operation between the optical transmission apparatus 11 and the optical transmission apparatus 12, illustrated in FIG. 7, is normal. Table 5 lists the settings of each optical transmission apparatus in the optical ring network system 2 when the bypass communication path is set between the optical transmission apparatus 11 and the optical transmission apparatus 12, illustrated in FIG. 7 with the two-way communication paths for normal operation suffering from faults.

TABLE 4

| | Optical transmission apparatuses | | | |
|---|---|---|---|---|
| | 11 | 12 | 13 | 14 |
| Optical channel $\lambda_1$ | East | West | — | — |
| Optical channel $\lambda_2$ | Thru | Thru | East | West |
| TX source identifier | A | B | C | D |
| RX expectation optical path identifier | B | A | D | C |

TABLE 5

| | Optical transmission apparatuses | | | |
|---|---|---|---|---|
| | 11 | 12 | 13 | 14 |
| Optical channel $\lambda_1$ | East | West | — | — |
| Optical channel $\lambda_2$ | West | East | Thru | Thru |
| TX source identifier | A | B | C | D |
| RX expectation optical path identifier | B | A | D | C |

As listed in table 4, the optical transmission apparatus 11 transmits and receives the optical signals on the optical channel on the wavelength $\lambda_1$ via the optical fiber cables 21 and 31 connected to the east terminals thereon when the communication path for the normal operation is normal. The optical transmission apparatus 11 then causes the optical signal on the optical channel on the wavelength $\lambda_2$ to pass directly therethrough. The optical transmission apparatus 11 includes the identification information "A" identifying the optical ring network system 11 in the optical signal output therefrom. The optical transmission apparatus 11 stores the identification information "B" as the reception expectation optical path identifier identifying the optical transmission apparatus 12. Similarly, the optical transmission apparatus 12 transmits and receives the optical signals on the optical channel on the wavelength $\lambda_1$ via the optical fiber cables 21 and 31 connected to the west terminals thereon. The optical transmission apparatus 12 then causes the optical signal on the optical channel on the wavelength $\lambda_2$ to pass directly therethrough. The optical transmission apparatus 12 includes the identification information "B" identifying the optical ring network system 12 in the optical signal output therefrom. The optical transmission apparatus 12 stores the identification information "A" as the reception expectation optical path identifier identifying the optical transmission apparatus 11.

The optical transmission apparatus 13 transmits and receives the optical signal on the optical channel on the wavelength $\lambda_2$ via the optical fiber cables 23 and 33 connected to the east terminals thereon. The optical transmission apparatus 13 includes the identification information "C" as the transmission source identifier identifying the optical transmission apparatus 13 into the optical signal output therefrom. The optical transmission apparatus 13 stores the identification information "D" as the reception expectation optical path identifier identifying the optical transmission apparatus 14 with the optical channel on the wavelength $\lambda_2$ mapped to the identification information "D." Similarly, the optical transmission apparatus 14 transmits and receives the optical signal on the optical channel on the wavelength $\lambda_2$ via the optical fiber cables 23 and 33 connected to the west terminals thereon. The optical transmission apparatus 14 includes the identification information "D" as the transmission source identifier identifying the optical transmission apparatus 14 into the optical signal output therefrom. The optical transmission apparatus 14 stores the identification information "C" as the reception expectation optical path identifier identifying the optical transmission apparatus 13 with the optical channel on the wavelength $\lambda_2$ mapped to the identification information "C." The settings of the optical channel on the wavelength $\lambda_1$ are undefined on the optical transmission apparatuses 13 and 14. Each of the optical transmission apparatuses 13 and 14 may cause the optical signal via the optical channel on the wavelength $\lambda_1$ to pass directly therethrough. Alternatively, a separate communication path may be set up in the optical channel on the wavelength $\lambda_1$.

As listed in table 5, the bypass communication path is set up between the optical transmission apparatus 11 and the optical transmission apparatus 12. The optical transmission apparatus 11 transmits and receives the optical signals on the optical channel on the wavelength $\lambda_2$ via the optical fiber cables 24 and 34 connected to the west terminals thereon. Similarly, the optical transmission apparatus 12 transmits and receives the optical signals on the optical channel on the wavelength $\lambda_2$ via the optical fiber cables 22 and 32 connected to the east terminals thereon. Each of the optical transmission apparatuses 13 and 14 causes the optical signal on the optical channel on the wavelength $\lambda_2$ to pass directly therethrough. The other settings remain unchanged from those of table 4.

In the optical ring network system 2 of the second embodiment as described above, the optical channel on the backup wavelength for a high-priority communication path may be used for a low-priority communication path. The optical ring network system 2 may provide communication paths of the number larger than the optical ring network system 1 of the first embodiment during normal operating condition. The optical ring network system 2 thus offers a high path use efficiency. As each optical transmission apparatus in the optical ring network system 1 of the first embodiment, each optical transmission apparatus in the optical ring network system 2 of the second embodiment detects the occurrence of a fault using the transmission source identifier extracted from the optical signal on the currently operative (working) wavelength. The optical transmission apparatus having detected a fault may cause the optical transmission apparatus as the communication partner to switch communication paths. The optical ring network system 2 thus provides the same advantage as those of the optical ring network system 1 of the first embodiment.

In the optical ring network system 2 of the second embodiment, a plurality of communication paths may be set up in the same optical fiber cable. If faults occurs in the optical fiber cable allowing the plurality of communication paths to pass therethrough, a bypass communication path is preferably set up for each communication path. The storage unit in each optical transmission apparatus preferably stores the identification information of the corresponding backup optical channel for each communication path passing via the optical transmission apparatus. The controller in the optical transmission apparatus having detected the fault includes in the reception error notification signal the identification information of the backup optical channel for the communication path incapacitated from communication by the fault. The controller transmits to a next optical transmission apparatus the reception error notification signal containing the identification information of the backup optical channel corresponding to the communication path incapacitated from communication by the fault. The optical transmission apparatus having received the reception error notification signal releases a low-priority communication path based on the optical channel identified by the identification information of the backup optical channel contained in the reception error notification signal. The optical transmission apparatus having detected the occurrence of the fault thus sets up a bypass communication path based on the backup optical channel corresponding to the high-priority communication path incapacitated from communication by the fault. Each optical transmission apparatus may determine whether to release the low-priority communication path by monitoring the optical signal having the same wavelength as the wavelength of the low-priority communication path and transmitted in a direction opposite to the direction of the low-priority communication path.

Figure 8:
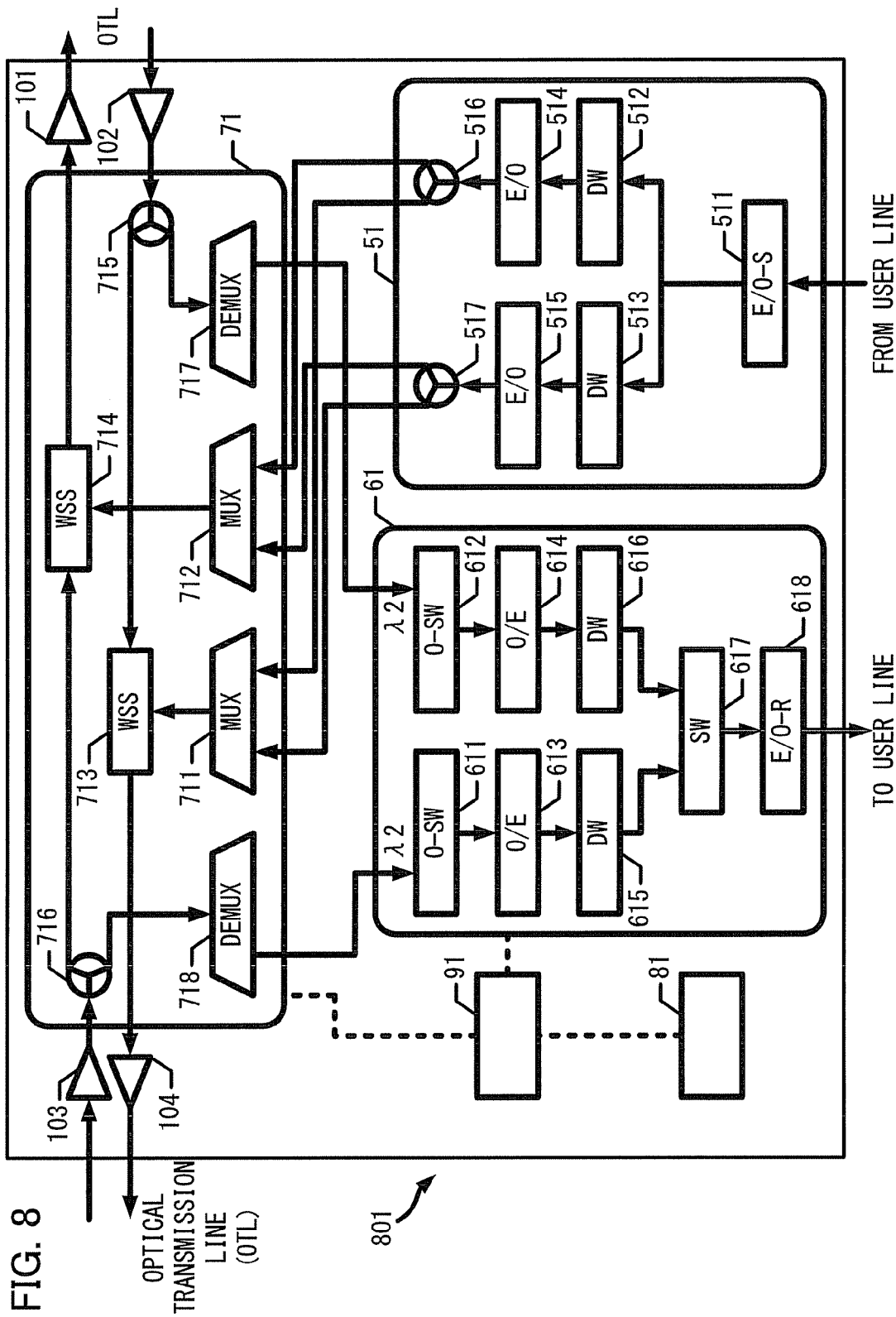
FIG. 8 is a block diagram illustrating an optical transmission apparatus used in the optical ring network system of the second embodiment.

FIG. 8 is a block diagram diagrammatically illustrating an optical transmission apparatus 801 that monitors an optical signal transmitted in a direction opposite to the direction of the low-priority communication path. The elements in the optical transmission apparatus 801 illustrated in FIG. 8 identical to those in the optical transmission apparatus 11 illustrated in FIG. 2 are designated with the same reference numerals. The optical transmission apparatus 801 is different from the optical transmission apparatus 11 illustrated in FIG. 2 in that two digital wrappers (DW) in the optical ring receiving unit 61 receive, on a per optical transmission line basis, optical signals on the optical channel on the wavelength $\lambda_2$ used on the low-priority communication path. The optical ring transmitting unit 51 outputs only the optical signal on the wavelength $\lambda_2$ to the cross-connect unit 71. The digital wrapper (DW) used to generate the optical signal on the wavelength $\lambda_1$ may be omitted from the optical ring transmitting unit 51.

The switch circuit (SW) 617 in the optical ring receiving unit 61 is set so that an electrical signal output from one of the two digital wrappers (DW) receiving the optical signal via the optical transmission line having the low-priority communication path set thereon is always output to the user line 41. The other digital wrapper (DW) attempts to extract the transmission source identifier from the received optical signal. That digital wrapper is hereinafter referred to as a monitoring digital wrapper. Upon extracting the transmission source identifier, the monitoring digital wrapper supplies the controller 91 with a reception acknowledge signal indicating that an optical signal has been received from a communication path other than the low-priority communication path. Upon receiving the reception acknowledge signal from the monitoring digital wrapper, the controller 91 determines that a fault has occurred in the high-priority communication path having the optical channel on the wavelength $\lambda_2$ serving as a backup path. The controller 91 causes the optical ring transmitting unit 51 to stop transmitting the optical signal on the wavelength $\lambda_2$. The controller 91 controls the cross-connect unit 71 to cause the optical signal on the wavelength $\lambda_2$ received via the optical transmission line to pass directly through the optical transmission apparatus 801.

A modification of the second embodiment is described below. In the modification of the second embodiment, each of the optical transmission apparatuses 13 and 14 illustrated in FIG. 7 is identical in structure to the optical transmission apparatus 801 illustrated in FIG. 8. The optical ring receiving unit 63 in the optical transmission apparatus 13 permanently connects the low-priority communication path 702 passing through the optical fiber cable 33 to the user line 43 so that the optical signal on the wavelength $\lambda_2$ having traveled through the low-priority communication path 702 is supplied to the user line 43. The digital wrappers in the optical ring receiving unit 63 monitor the optical signal on the wavelength $\lambda_2$ having traveled through the optical fiber cable 22. If no fault occurs in the high-priority communication path 701, the optical transmission apparatus 12 does not transmit the optical signal on the wavelength $\lambda_2$ to the optical transmission line 20. The monitoring digital wrapper in the optical ring receiving unit 63 in the optical transmission apparatus 13 does not receive the optical signal. Using the low-priority communication line 702 set up to the optical transmission apparatus 14, the optical transmission apparatus 13 performs communications between the user line 43 and the user line 44.

On the other hand, if a fault occurs in the high-priority communication path 701, the optical transmission apparatus 12 transmits the optical signal on the wavelength $\lambda_2$ to the optical transmission line 20. The monitoring digital wrapper in the optical ring receiving unit 63 in the optical transmission apparatus 13 receives the optical signal from the optical transmission apparatus 12, and extracts the transmission source identifier. Upon receiving the reception acknowledgement signal from the monitoring digital wrapper, the controller 93 in the optical transmission apparatus 13 causes the optical ring transmitting unit 53 to stop transmitting the optical signal on the wavelength $\lambda_2$. The controller 93 controls the cross-connect unit 73 so that the optical signal on the wavelength $\lambda_2$ output from another optical transmission apparatus passes directly through the optical transmission apparatus 13.

The optical signal on the wavelength $\lambda_2$ output from the optical transmission apparatus 12 reaches the optical transmission apparatus 14 via the optical transmission line 30. The transmission source identifier extracted from the optical signal fails to match the reception expectation optical path identifier stored on the storage unit 84 in the optical transmission apparatus 14. The controller 94 in the optical transmission apparatus 14 controls the cross-connect unit 74 so that the optical signal on the wavelength $\lambda_2$ output from another optical transmission apparatus directly passes through the optical transmission apparatus 14. The controller 94 causes the optical ring transmitting unit 54 to stop transmitting the optical signal on the wavelength $\lambda_2$.

The optical transmission apparatus 14 may determine whether to release the communication path 702 by monitoring the optical signal on the wavelength $\lambda_2$ output from the optical transmission apparatus 11. In such a case, the optical transmission apparatus 14 performs the same process as the process of the optical transmission apparatus 13.

Through the above-described series of process steps, the optical signal on the wavelength $\lambda_2$ output from the optical transmission apparatus 11 reaches the optical transmission apparatus 12 via the optical transmission line 30. The optical signal on the wavelength $\lambda_2$ output from the optical transmission apparatus 12 reaches the optical transmission apparatus 11 via the optical transmission line 20. Communications between the optical transmission apparatus 11 and the optical transmission apparatus 12 are maintained by switching between two-ways communication paths.

Upon detecting the optical signal coming in an opposite direction on an optical channel having the same wavelength as the wavelength used in the low-priority communication path, the optical transmission apparatus with the low-priority communication path set therewithin releases the low-priority communication path. The optical ring network system 2 of the second embodiment is free from the service optical channel. The optical ring network system 2 may set a larger number of communication paths accordingly, and the path usage efficiency is increased. The optical ring network system 2 is also free from a communication path switching malfunction due to a fault in the service optical channel.

The optical ring network system and the optical transmission apparatus disclosed herein control a transmission delay in the event of a fault while controlling a decrease in the number of available communication channels and an increase in involved costs during normal operation.

The present invention is not limited to the above-described embodiments. For example, the number of optical transmission apparatuses in the optical ring network system is not limited to four. The optical transmission apparatuses more than or less than four may be employed. Maintainability of the controller of each optical transmission apparatus in the optical ring network system may be increased. For example, when the controller is set in a maintenance mode by an operation unit (not illustrated), the transmission source identifier may be replaced with the identification information of another optical transmission apparatus in response to an operation input by maintenance personnel on the operation unit. In this way, the optical ring network system simulates a pseudo-fault in any communication path. The maintenance personnel verifies whether a bypass communication path is correctly established for the communication path suffering from the pseudo-fault.

If the controller in each optical transmission apparatus fails to extract the switch request flag from the received optical signal on the currently operative (working) wavelength, the controller may determine that a fault occurs in the communication path through which the optical signal is expected to travel. In each optical transmission apparatus, not the controller but the digital wrapper in the optical ring receiving unit may determine whether the transmission source identifier matches the reception expectation optical path identifier. In this case, the digital wrapper in the optical ring receiving unit notifies the controller of the determination results. The controller may switch the communication paths in the same manner as described with reference to the first embodiment by controlling the cross-connect unit and the optical ring receiving unit in response to the notified determination results.

Those skilled in the art may understand that a variety of changes are possible to the above-described embodiments without departing from the scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical ring network system comprising:
   a first optical transmission line on which optical signals are transmitted in a first direction, being formed to a ring;
   a second optical transmission line on which optical signals are transmitted in a second direction of an opposite direction as the first direction, being formed to the ring;
   a first optical transmission apparatus connecting to the first optical transmission line and the second optical transmission line, being operable to transmit a first optical signal including a transmission source identifier indicating a transmission source of a transmitted signal, the first optical signal being on a first wavelength, transmitted to a first communication path formed on one of the first optical transmission line and the second optical transmission line; and
   a second optical transmission apparatus connecting to the first optical transmission line and the second optical transmission line, being operable to determine whether the transmission source identifier included in the first optical signal received over the first communication path matches a pre-stored reception expectation optical path identifier indicating an optical transmission apparatus of a communication partner;

wherein the second optical transmission apparatus is operable to transmit a second optical signal including a switch request signal to request that the transmitted signal from the first optical transmission apparatus is transmitted to a second communication path in an opposite direction as the first communication path, the second optical signal being on the first wavelength, transmitted to the first communication path formed on the other one of the first optical transmission line and the second optical transmission line, and operable to receive a third optical signal on a second wavelength over the second communication path transmitted from the first optical transmission apparatus, in case of one of that the transmission source identifier differs from the reception expectation optical path identifier and that the transmission source identifier is not detected in the first optical signal.

2. The optical ring network system according to claim 1, wherein the first optical transmission apparatus transmits the third optical signal to the second communication path in case of receiving the second optical signal including the switch request signal over the first communication path.

3. The optical ring network system according to claim 1, wherein the second optical transmission apparatus transmits the second optical signal to the first communication path and transmits a fourth optical signal on the second wavelength to the second communication path, in case of one of that the transmission source identifier differs from the reception expectation optical path identifier and that the transmission source identifier is not detected in the first optical signal.

4. The optical ring network system according to claim 1, further comprising:
    a third optical transmission apparatus connecting to the first optical transmission line and the second optical transmission line; and
    a fourth optical transmission apparatus connecting to the first optical transmission line and the second optical transmission line;
    wherein the third optical communication apparatus and the fourth optical communication apparatus mutually communicate an optical signal on the second wavelength over a third communication path formed between the third optical transmission apparatus and the fourth optical transmission apparatus and not through the first optical transmission apparatus and the second optical transmission apparatus in case that the first communication path has no failure; and
    the second optical transmission apparatus requests of the third optical transmission apparatus and the fourth optical transmission apparatus to stop communicating over the third communication path and to pass through the optical signal on the second wavelength, in case of one of that the transmission source identifier differs from the reception expectation optical path identifier and that the transmission source identifier is not detected in the first optical signal.

5. The optical ring network system according to claim 2, further comprising:
    a third optical transmission apparatus connecting to the first optical transmission line and the second optical transmission line; and
    a fourth optical transmission apparatus connecting to the first optical transmission line and the second optical transmission line;
    wherein the third optical communication apparatus and the fourth optical communication apparatus mutually communicate an optical signal on the second wavelength over a third communication path formed between the third optical transmission apparatus and the fourth optical transmission apparatus and not through the first optical transmission apparatus and the second optical transmission apparatus in case that the first communication path has no failure; and
    the second optical transmission apparatus requests of the third optical transmission apparatus and the fourth optical transmission apparatus to stop communicating over the third communication path and to pass through the optical signal on the second wavelength, in case of one of that the transmission source identifier differs from the reception expectation optical path identifier and that the transmission source identifier is not detected in the first optical signal.

6. The optical ring network system according to claim 3, further comprising:
    a third optical transmission apparatus connecting to the first optical transmission line and the second optical transmission line; and
    a fourth optical transmission apparatus connecting to the first optical transmission line and the second optical transmission line;
    wherein the third optical communication apparatus and the fourth optical communication apparatus mutually communicate an optical signal on the second wavelength over a third communication path formed between the third optical transmission apparatus and the fourth optical transmission apparatus and not through the first optical transmission apparatus and the second optical transmission apparatus in case that the first communication path has no failure; and
    the second optical transmission apparatus requests of the third optical transmission apparatus and the fourth optical transmission apparatus to stop communicating over the third communication path and to pass through the optical signal on the second wavelength, in case of one of that the transmission source identifier differs from the reception expectation optical path identifier and that the transmission source identifier is not detected in the first optical signal.

7. An optical transmission apparatus connected with an optical ring network including a first optical transmission line on which optical signals are transmitted in a first direction, and a second optical transmission line on which optical signals are transmitted in a second direction of an opposite direction as the first direction, the first and second optical transmission lines being formed to a ring, the optical transmission apparatus comprising:
    a storage unit operable to store a reception expectation optical path identifier indicating an optical transmission apparatus of a communication partner decided beforehand;
    a receiving unit operable to selectively receive one of a first optical signal on a first wavelength transmitted from the optical transmission apparatus of the communication partner and a third optical signal on a second wavelength transmitted from the optical transmission apparatus of the communication partner, and to extract a transmission source identifier indicating a transmission source of a transmitted signal, from the received first optical signal, the first optical signal being transmitted over a first communication path formed on one of the first optical transmission line and the second optical transmission line by which the optical transmission apparatus is connected to the other optical transmission apparatus included on the optical ring network, the third optical signal being transmitted over a second communication path in an opposite direction as the first communication path;

a transmitting unit operable to transmit a second optical signal on the first wavelength to the first communication path formed on the other one of the first optical transmission line and the second optical transmission line; and a controller operable to determine whether the transmission source identifier matches the reception expectation optical path identifier, and to control the transmitting unit so that the second optical signal includes a switch request signal to request that the transmitted signal from the optical transmission apparatus of the communication partner is transmitted to the second communication path and the receiving unit receives the third optical signal over the second communication path, in case of one of that the transmission source identifier differs from the reception expectation optical path identifier and that the transmission source identifier is not detected in the first optical signal.

8. A switching method for communication paths of an optical transmission apparatus connected with an optical ring network including a first optical transmission line on which optical signals are transmitted in a first direction, and a second optical transmission line on which optical signals are transmitted in a second direction of an opposite direction as the first direction, the first and second optical transmission lines being formed to a ring, the switching method comprising:

extracting a transmission source identifier indicating a transmission source of a transmitted signal from a received first optical signal on a first wavelength transmitted from an optical transmission apparatus of a communication partner, over a first communication path formed on one of the first optical transmission line and the second transmission line connecting by which the optical transmission apparatus is connected to the optical transmission apparatus of a communication partner included on the optical ring network;

determining whether the transmission source identifier matches a pre-stored reception expectation optical path identifier indicating the optical transmission apparatus of the communication partner;

transmitting, to the first communication path formed on the other one of the first optical transmission line and the second optical transmission line, a second optical signal including a switch request signal to request that the transmitted signal from the optical transmission apparatus of the communication partner is transmitted to a second communication path in an opposite direction as the first communication path, in case of one of that the transmission source identifier differs from the reception expectation optical path identifier and that the transmission source identifier is not detected in the first optical signal; and receiving a third optical signal on a second wavelength over the second communication path.

* * * * *